(12) United States Patent
Holland et al.

(10) Patent No.: US 12,308,988 B2
(45) Date of Patent: May 20, 2025

(54) MULTI-USER EXPERIENCE COORDINATION SYSTEM

(71) Applicant: QUALCOMM Incorporated, San Diego, CA (US)

(72) Inventors: Wesley James Holland, Encinitas, CA (US); Ziad Asghar, San Diego, CA (US); Jian Shen, San Diego, CA (US); Miran Chun, San Diego, CA (US); Daniel Jared Sinder, San Diego, CA (US); Vikram Gupta, San Diego, CA (US); Khaled Helmi El-Maleh, San Marcos, CA (US); Vinesh Sukumar, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/447,939

(22) Filed: Aug. 10, 2023

(65) Prior Publication Data
US 2025/0055717 A1     Feb. 13, 2025

(51) Int. Cl.
*H04L 12/18* (2006.01)
*H04L 67/131* (2022.01)
(52) U.S. Cl.
CPC ........ *H04L 12/1818* (2013.01); *H04L 67/131* (2022.05)
(58) Field of Classification Search
CPC ............................ H04L 12/1818; H04L 67/131
See application file for complete search history.

(56) References Cited

U.S. PATENT DOCUMENTS

| 2007/0143482 A1* | 6/2007 | Zancho ................ H04L 67/306 709/227 |
| 2020/0009459 A1 | 1/2020 | Kozloski et al. |
| 2022/0137701 A1* | 5/2022 | Bowman ................ G06F 3/013 345/156 |
| 2023/0057203 A1* | 2/2023 | Hoagland ........... H04L 63/0823 |

FOREIGN PATENT DOCUMENTS

EP           2953098 A1       12/2015

OTHER PUBLICATIONS

International Search Report and Written Opinion—PCT/US2024/040987—ISA/EPO—Nov. 27, 2024.

* cited by examiner

*Primary Examiner* — Nazia Naoreen
(74) *Attorney, Agent, or Firm* — Polsinelli LLP

(57) ABSTRACT

Systems and techniques are provided for coordinating multi-user experiences. For example, a process can include obtaining a plurality of settings associated with a plurality of multi-user experience participants. The plurality of settings includes one or more arbitrated settings and one or more non-arbitrated settings. The process can include arbitrating, by a settings arbitration engine, the one or more arbitrated settings to generate one or more adjusted settings for each arbitrated setting. The process can include generating, by an experience adaptation engine, an adapted multi-user experience, wherein the adapted multi-user experience is configured to enforce the one or more adjusted settings for each arbitrated setting.

40 Claims, 9 Drawing Sheets

MULTI-USER EXPERIENCE COORDINATION SYSTEM

FIELD

The present disclosure is related to multi-user experiences. In some examples, aspects of the present disclosure are related to systems and techniques for a multi-user experience management that can coordinate between different experience settings for multi-user experience participants.

BACKGROUND

An extended reality (XR) (e.g., virtual reality, augmented reality, mixed reality) system can provide a user with a virtual experience by immersing the user in a completely virtual environment (made up of virtual content) and/or can provide the user with an augmented or mixed reality experience by combining a real-world or physical environment with a virtual environment.

One example use case for XR content that provides virtual, augmented, or mixed reality to users is to present a user with a "metaverse" experience. The metaverse is essentially a virtual universe that includes one or more three-dimensional (3D) virtual worlds. For example, a metaverse virtual environment may allow a user to virtually interact with other users (e.g., in a social setting, in a virtual meeting, etc.), to virtually shop for goods, services, property, or other item, to play computer games, and/or to experience other services.

Machine learning models (e.g., deep learning models such as neural networks) can be used to perform a variety of tasks, including natural language processing (NLP), image processing, audio processing, depth estimation, detection and/or recognition (e.g., scene or object detection and/or recognition), pose estimation, image reconstruction, classification, three-dimensional (3D) modeling, dense regression tasks, data compression and/or decompression, image processing, among other tasks. Machine learning models can be versatile and can achieve high quality results in a variety of tasks.

BRIEF SUMMARY

In some examples, systems and techniques are described for coordinating multi-user experiences. According to at least one example, a method is provided for coordinating multi-user experiences. The method includes: obtaining a plurality of settings associated with a plurality of multi-user experience participants, wherein the plurality of settings includes one or more arbitrated settings and one or more non-arbitrated settings; arbitrating, by a settings arbitration engine, the one or more arbitrated settings to generate one or more adjusted settings for each arbitrated setting; and generating, by an experience adaptation engine, an adapted multi-user experience, wherein the adapted multi-user experience is configured to enforce the one or more adjusted settings for each arbitrated setting.

In another example, an apparatus for coordinating multi-user experiences is provided that includes at least one memory and at least one processor coupled to the at least one memory. The at least one processor is configured to: obtain a plurality of settings associated with a plurality of multi-user experience participants, wherein the plurality of settings includes one or more arbitrated settings and one or more non-arbitrated settings; arbitrate, by a settings arbitration engine, the one or more arbitrated settings to generate one or more adjusted settings for each arbitrated setting; and generate, by an experience adaptation engine, an adapted multi-user experience, wherein the adapted multi-user experience is configured to enforce the one or more adjusted settings for each arbitrated setting.

In another example, a non-transitory computer-readable medium is provided that has stored thereon instructions that, when executed by one or more processors, cause the one or more processors to: obtain a plurality of settings associated with a plurality of multi-user experience participants, wherein the plurality of settings includes one or more arbitrated settings and one or more non-arbitrated settings; arbitrate, by a settings arbitration engine, the one or more arbitrated settings to generate one or more adjusted settings for each arbitrated setting; and generate, by an experience adaptation engine, an adapted multi-user experience, wherein the adapted multi-user experience is configured to enforce the one or more adjusted settings for each arbitrated setting.

In another example, an apparatus for coordinating multi-user experiences is provided. The apparatus includes: means for obtaining a plurality of settings associated with a plurality of multi-user experience participants, wherein the plurality of settings includes one or more arbitrated settings and one or more non-arbitrated settings; means for arbitrating, by a settings arbitration engine, the one or more arbitrated settings to generate one or more adjusted settings for each arbitrated setting; and means for generating, by an experience adaptation engine, an adapted multi-user experience, wherein the adapted multi-user experience is configured to enforce the one or more adjusted settings for each arbitrated setting.

In some aspects, one or more of the apparatuses described above is, is part of, or includes a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a vehicle (e.g., a computing device of a vehicle), or other device. In some aspects, an apparatus includes a camera or multiple cameras for capturing one or more images. In some aspects, the apparatus includes a display for displaying one or more images, notifications, and/or other displayable data. In some aspects, the apparatus can include one or more sensors. In some cases, the one or more sensors can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
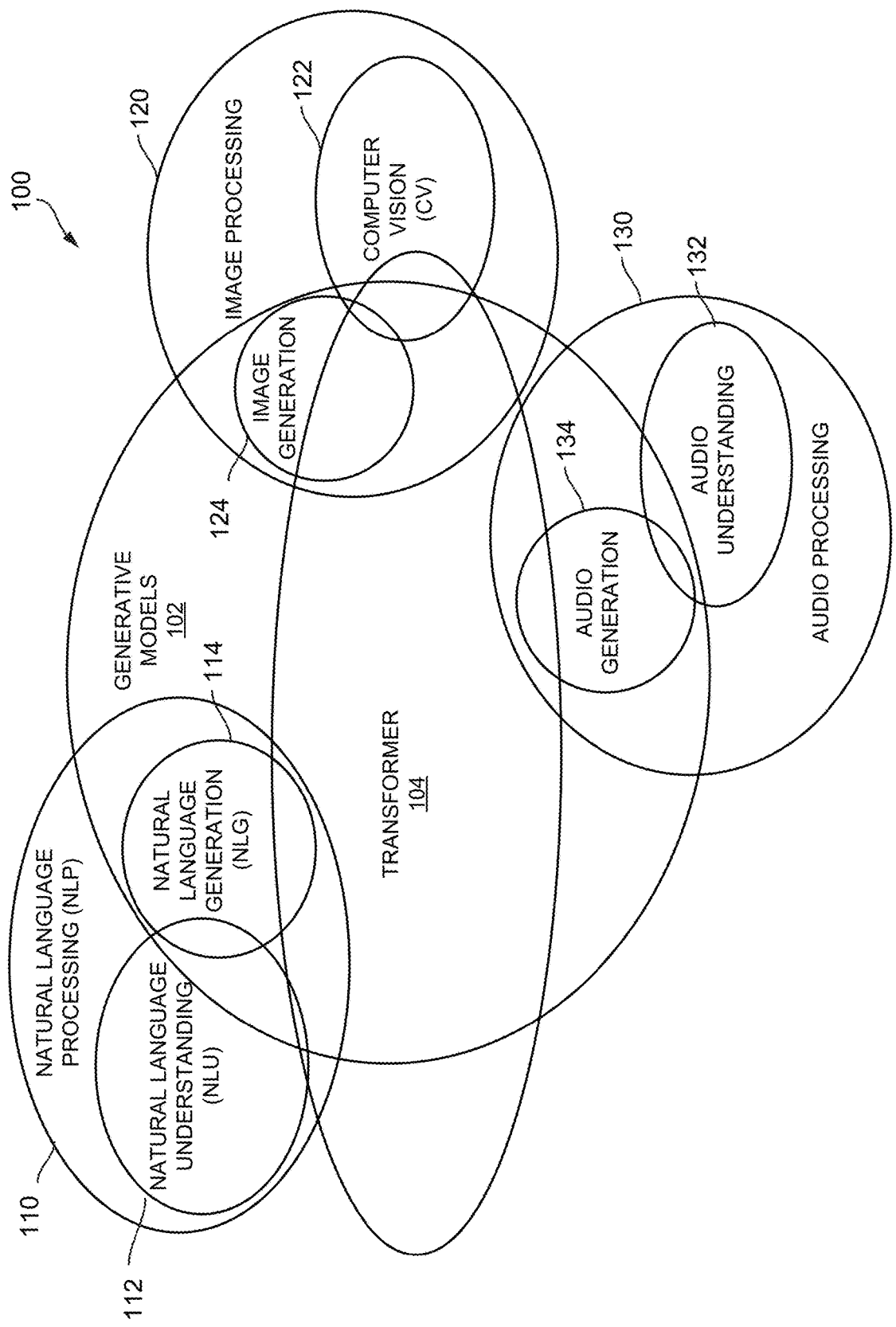
FIG. 1 is a diagram illustrating example relationships between machine learning tasks and various categories of neutral networks, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

As noted previously, an extended reality (XR) system or device can provide a user with an XR experience by presenting virtual content to the user (e.g., for a completely immersive experience) and/or can combine a view of a real-world or physical environment with a display of a virtual environment (made up of virtual content). The real-world environment can include real-world objects (also referred to as physical objects), such as people, vehicles, buildings, tables, chairs, and/or other real-world or physical objects. As used herein, the terms XR system and XR device are used interchangeably. Examples of XR systems or devices include head-mounted displays (HMDs), smart glasses (e.g., AR glasses, MR glasses, etc.), among others.

XR systems can include virtual reality (VR) systems facilitating interactions with VR environments, augmented reality (AR) systems facilitating interactions with AR environments, mixed reality (MR) systems facilitating interactions with MR environments, and/or other XR systems. For instance, VR provides a complete immersive experience in a three-dimensional (3D) computer-generated VR environment or video depicting a virtual version of a real-world environment. VR content can include VR video in some cases, which can be captured and rendered at very high quality, potentially providing a truly immersive virtual reality experience. Virtual reality applications can include gaming, training, education, sports video, online shopping, among others. VR content can be rendered and displayed using a VR system or device, such as a VR HMD or other VR headset, which fully covers a user's eyes during a VR experience.

AR is a technology that provides virtual or computer-generated content (referred to as AR content) over the user's view of a physical, real-world scene or environment. AR content can include any virtual content, such as video, images, graphic content, location data (e.g., global positioning system (GPS) data or other location data), sounds, any combination thereof, and/or other augmented content. An AR system is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

MR technologies can combine aspects of VR and AR to provide an immersive experience for a user. For example, in an MR environment, real-world and computer-generated objects can interact (e.g., a real person can interact with a virtual person as if the virtual person were a real person).

An XR environment can be interacted with in a seemingly real or physical way. As a user experiencing an XR environment (e.g., an immersive VR environment) moves in the real world, rendered virtual content (e.g., images rendered in a virtual environment in a VR experience) also changes, giving the user the perception that the user is moving within the XR environment. For example, a user can turn left or right, look up or down, and/or move forwards or backwards, thus changing the user's point of view of the XR environment. The XR content presented to the user can change accordingly, so that the user's experience in the XR environment is as seamless as it would be in the real world.

In some cases, an XR system can match the relative pose and movement of objects and devices in the physical world. For example, an XR system can use tracking information to calculate the relative pose of devices, objects, and/or features of the real-world environment in order to match the relative position and movement of the devices, objects, and/or the real-world environment. In some examples, the XR system can use the pose and movement of one or more devices, objects, and/or the real-world environment to render content relative to the real-world environment in a convincing manner. The relative pose information can be used to match virtual content with the user's perceived motion and the spatio-temporal state of the devices, objects, and real-world environment. In some cases, an XR system can track parts of the user (e.g., a hand and/or fingertips of a user) to allow the user to interact with items of virtual content.

XR systems or devices can facilitate interaction with different types of XR environments (e.g., a user can use an XR system or device to interact with an XR environment). One example of an XR environment is a metaverse virtual environment. A user may participate in one or more virtual sessions with other users by virtually interacting with other users (e.g., in a social setting, in a virtual meeting, etc.), virtually shopping for items (e.g., goods, services, property, etc.), virtually playing computer games, and/or experiencing other services in a metaverse virtual environment. In one illustrative example, a virtual session provided by an XR system may include a 3D collaborative virtual environment for a group of users. The users may interact with one another via virtual representations of the users in the virtual environment. The users may visually, audibly, haptically, or otherwise experience the virtual environment while interacting with virtual representations of the other users.

A virtual representation of a user may be used to represent the user in a virtual environment. A virtual representation of a user is also referred to herein as an avatar. An avatar representing a user may mimic an appearance, movement, mannerisms, and/or other features of the user. A virtual representation or avatar may be generated/animated in realtime based on captured input from users devices. Avatars may range from basic synthetic 3D representations to more realistic representations of the user. In some examples, the user may desire that the avatar representing the person in the virtual environment appear as a digital twin of the user. In any virtual environment, it is important for an XR system to efficiently generate high-quality avatars (e.g., realistically representing the appearance, movement, etc. of the person) in a low-latency manner. It can also be important for the XR system to render audio in an effective manner to enhance the XR experience.

For instance, in the example of the 3D collaborative virtual environment from above, an XR system a user from the group of users may display virtual representations (or avatars) of the other users sitting at specific locations at a virtual table or in a virtual room. The virtual representations of the users and the background of the virtual environment should be displayed in a realistic manner (e.g., as if the users were sitting together in the real world). The heads, bodies, arms, and hands of the users can be animated as the users move in the real world. Audio may need to be spatially rendered or may be rendered monophonically. Latency in rendering and animating the virtual representations should be minimal in order to maintain a high-quality user experience.

Machine learning systems (e.g., deep neural network systems or models) can be used to perform a variety of tasks such as, for example and without limitation, detection and/or recognition (e.g., scene or object detection and/or recognition, face detection and/or recognition, etc.), depth estimation, pose estimation, image reconstruction, classification, three-dimensional (3D) modeling, dense regression tasks, data compression and/or decompression, audio processing, and image processing, among other tasks. Moreover, machine learning models can be versatile and can achieve high quality results in a variety of tasks.

Different types of neural networks exist, such as deep generative neural network models (e.g., generative pre-trained transformers (GPTs) generative adversarial network (GANs)), recurrent neural network (RNN) models, multi-layer perceptron (MLP) neural network models, convolutional neural network (CNN) models, among others.

FIG. 1 is a diagram 100 illustrating example relationships between machine learning tasks and various categories of neutral networks. In the example of FIG. 1, the largest oval represents a class of machine learning systems called generative models 102. As used herein, the term generative models 102 refers to models that are capable of generating new data instances. In some cases, generative models 102 can be implemented with different machine learning architectures. For example, as noted above, GANs and GPTs are examples of deep generative neural network models. In addition to generative models 102, there are classes of machine learning systems, such as discriminative models. As used herein, discriminative models are models that discriminate between different types of data instances.

FIG. 1 illustrates another large oval representing a transformer 104 neural network architecture. As illustrated in FIG. 1, the transformer 104 can be utilized as a generative model 102 (e.g., for performing generative tasks) and/or as a non-generative model (e.g., a discriminative model). In general, a transformer 104 is a deep learning model. A transformer typically performs self-attention (e.g., using at least one self-attention layer), differentially weighting the significance of each part of input (which includes the recursive output) data. Transformers can be used in many contexts, including the fields of natural language processing (NLP) 110, image processing 120, audio processing 130, or the like. Like recurrent neural networks (RNNs), transformers are designed to process sequential input data, such as natural language, with application to tasks such as translation and text summarization. However, unlike RNNs, transformers process the entire input all at once. The attention mechanism provides context for any position in the input sequence. For example, if the input data is a natural language sentence, the transformer does not have to process one word at a time. This allows for more parallelization than RNNs and therefore reduces training times. Compared to RNN models, transformers are more amenable to parallelization, allowing training on larger datasets.

As illustrated in FIG. 1, NLP can include both natural language understanding (NLU) 112 and natural language generation (NLG) 114. NLU 112 refers to understanding the meaning of written and/or spoken language (e.g., text, speech, or a combination thereof). Examples of the NLU 112 include text inference or email classification. NLG 114 refers to the task of producing written and/or spoken language (e.g., text, speech, or a combination thereof) from structured data, unstructured data, or a combination thereof. Examples of NLG 114 include query-focused summarization, story generation, news summarization, conversational artificial intelligence (AI), an auto-complete system or combinations thereof. In some examples, NLP systems may include a combination of NLU 112 and NLG 114, such as question answering, interpreting and then summarizing content (e.g., a news article or a story), or a combination thereof. In some examples, NLG 114 can include transformer 104 based NLG as illustrated in FIG. 1.

In some cases, image processing 120 can also include understanding and generation aspects. For example, as illustrated in FIG. 1, image processing 120 includes image understanding (e.g., computer vision (CV) 122), and image generation 124. In one illustrative example, image processing 120 may be used to generate images of virtual environments, personal avatars, or the like in an XR environment.

Image processing 120 can include processing of individual images as well as sequences of image (e.g., sequential images in a video).

In another example, audio processing 130 can also include understanding and generation aspects. For example, as illustrated in FIG. 1, audio processing 130 includes audio understanding 132 and audio generation 134. For example, audio understanding 132 can be used to interpret audio data waveforms as words. Examples of audio generation 134 can include, synthesizing a voice (e.g., text to speech conversion), generating music, ambient sounds, and/or sound effects, or the like.

In some cases, multi-modal models (not shown) can incorporate and/or coordinate functionality between two or more different tasks. For example, a multi-model model can incorporate any combination of NLP 110, image processing 120, and/or audio processing 130. In on illustrative example, a multi-modal modal can receive audio data that contains a query, perform audio understanding 132 to generate a sequence of words (e.g., text) representing the query. In some examples, the sequence of words generated by audio understanding 132 can be an input to NLP 110, which can utilize NLU 112 to interpret the query and NLG 114 to generate an appropriate response. In some cases, a text response can be output from the NLG 114. In some implementations, audio generation 134 can convert the text response output from the NLG 114 into an audio response (e.g., a synthesized voice). In some implementations, image generation 124 can be used to generate an avatar (e.g., a 2D model, a 3D model, or the like) that can be displayed and coordinated with the output of the audio response generated by audio generation 134.

It should be understood that the examples of FIG. 1 are not meant to be limiting and are provided for the purposes of illustration only. Other types of machine learning models, neural network classes, neural network architectures, and/or any combination thereof that are not described herein can be used without departing from the scope of the present disclosure. Systems and techniques are needed for coordinating multi-user experiences. In some cases, the experience of different participants in a multi-user experience environment (e.g., an XR environment) can be different based on settings selected by each individual user. However, in some cases, coordinating the multi-user experience environment for different users can be beneficial to the quality of the multi-user experience. For example, for a collaborative meeting in a multi-user experience environment, it can be beneficial for each of the participants to be arranged in the same relative position relative to one another. For example, when a first user speaks to a second user, if the relative poses of the first and second users are different in the XR environment experienced for a third user, it may not be clear that the first user is speaking to the second user. For example, the first user may appear to the third user to be speaking to the third user. Such inconsistencies can result in confusion. However, in some cases, some inconsistencies between multi-user experience environments can have a positive effect on the multi-user experience environment experience for various multi-user experience participants. For example, different participants may experience different ambient light settings, different ambient sound level settings, one or more other settings, and/or any combination thereof. In some cases, the differences in settings may make each participant more interested or engaged with the multi-user experience.

Systems and techniques are described herein for coordinating multi-user experience. For example, in some cases, the systems and techniques herein can partition aggregated settings for a group of participants into arbitrated settings and non-arbitrated settings. In some cases, arbitrated settings can include preferences that are required to be consistent between all multi-user experience participants. For example, the quantity and/or position or seats in a meeting and/r the location of specific participants in the meeting can be arbitrated. In some examples, aspects of the multi-user experience environment associated with non-arbitrated settings can be different for different participants. For example, as described above, lighting conditions, ambient noise settings, or the like can be non-arbitrated settings. In some cases, the partitioning of arbitrated and non-arbitrated settings can vary between different multi-user experiences. For example, a multi-user experience attended by many participants with strong settings preferences may include more arbitrated preferences than a multi-user experience attended by participants without any strong preferences.

In some cases consistency between settings for arbitrated preferences can be made common by imposition of a mandatory setting. In some cases, a settings arbitration engine can determine one or more potential settings for each arbitrated setting. For example, the participant settings for a particular arbitrated setting across all of the participants may overlap in such a way that one or more potential settings for the arbitrated setting can be used as an adjusted setting for all participants. In some cases, two or more potential settings can be combined into a single adjusted setting that specifies a percentage for blending the two or more potential settings. For example, an arbitrated setting for furniture style may indicate that modern furniture and antique furniture are potential settings for all participants. In some cases, the settings arbitration engine can output the two potential settings. In some examples, the settings arbitration engine can combine the two potential settings into one adjusted setting.

The systems and techniques can generate an adapted experience by permitting participants to use their own settings for non-arbitrated settings and enforcing a common setting for the arbitrated settings. In some cases, the systems and techniques can monitor user engagement with the adapted experience. In some cases, participant settings can be updated based on the user engagement monitoring. In some cases, the systems and techniques can utilize machine learning models to generate the adapted experience (e.g., by a generative model), monitor participant engagement, and/or update participant settings.

Figure 2:
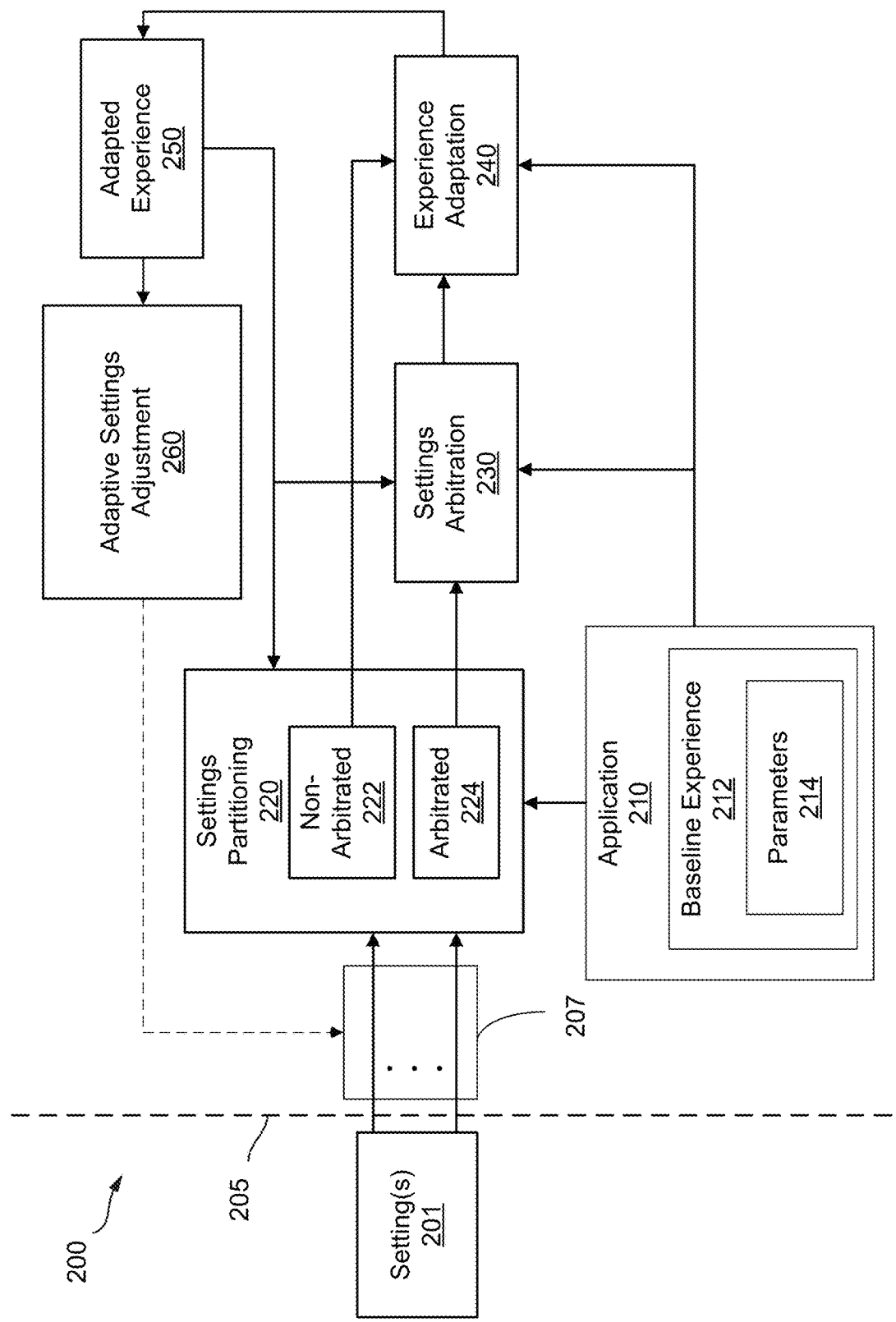
FIG. 2 is a block diagram illustrating an example of a multi-user experience coordination system, in accordance with some examples of the present disclosure.

Various aspects of the techniques described herein will be discussed below with respect to the figures. FIG. 2 illustrates an example multi-user experience coordination system 200. As illustrated, the multi-user experience coordination system 200 can include an application engine 210, a settings partitioning engine 220, a settings arbitration engine 230, an experience adaptation engine 240, adapted experience 250, and an adaptive settings adjustment engine 260. The multi-user experience coordination system 200 can obtain settings for different multi-user experience participants that may participate in a shared multi-user experience (e.g., a metaverse meeting). As used herein, multi-user experience participants can refer to individual users, devices, groups of users, and/or any combination thereof.

In some implementations, the settings partitioning engine 220, application engine 210, settings arbitration engine 230, experience adaptation engine 240, adapted experience 250, and adaptive settings adjustment engine 260 can be part of the same computing device. For example, in some cases, the settings partitioning engine 220, application engine 210, settings arbitration engine 230, experience adaptation engine 240, adapted experience 250, and adaptive settings adjustment engine 260 can be integrated into an HMD, extended reality glasses, smartphone, laptop, tablet computer, gaming system, and/or any other computing device. However, in some implementations, the settings partitioning engine 220, the application engine 210, settings arbitration engine 230, experience adaptation engine 240, adapted experience 250 and adaptive settings adjustment engine 260 can be part of two or more separate computing devices. For example, in some cases, some of the components 210-260 can be part of, or implemented by, one computing device and the remaining components can be part of, or implemented by, one or more other computing devices.

In some cases, an application engine 210 can include a baseline experience 212 and/or experience parameters 214. In some aspects, an application engine 210 can include an XR application. Example baseline experiences 212 can include, without limitation, gaming session, meeting, art exhibit, social gathering, party, any type other experience, and/or any combination thereof. Example experience parameters 214 can include, without limitation, number of participants, experience owner (e.g., a meeting creator, administrator, or the like), physical geography (e.g., in the Sahara desert, in Southern California, etc.), In some cases, each multi-user experience participant may provide one or more settings 201. In some cases, settings 201 for a multi-user experience participant can be selected explicitly through a user interface (e.g., an HMD settings menu, in a companion application, and/or any other user interface). In some examples, settings 201 for a multi-user experience participant can be generated by one or more machine learning models. For example, a deep-learning neural network may be trained to generate and/or update settings based on user feedback about the different multi-user experiences. In some cases, a deep-learning neural network can may be trained to detect and/or interpret content interaction information. For example, content interaction information can include, without limitation, eye tracking, data shared by multiple connected sensors and/or devices (e.g., a smart watch, vehicle, laptop, mobile device, HMD, or the like). In some cases, values for one or more settings 201 can be suggested by an aggregate recommender system (e.g., settings used by people like you, trending settings, celebrity settings, and/or any other settings recommendation).

In some examples, the settings 201 can include one or more multi-user experience environment appearance settings. For example, multi-user experience environment appearance settings can include, without limitation, room décor (e.g., quantity and/or position of furniture items (e.g., chairs, tables, etc.)), quantity and/or position of virtual displays for sharing content, lightning conditions (e.g., quantity and/or position of light sources, brightness, and/or color), audio settings (e.g., background noise levels, rate of decay, and/or echo behavior), music (e.g., music content, volume, and/or location of virtual speakers), sky appearance (e.g., time of day, color, weather, quantity and/or position of stars, moon, and/or planets), quantity and/or position of non-player characters (e.g., animals, virtual vendors, and/or virtual wait-staff), and/or non-player character behavior and/or appearance.

In some cases, settings 201 can include one or more language settings. For example, language settings can include a preference for automatically translating into a multi-user experience participant's selected language. In some cases, the language settings can include a preference for speech to be presented in the originally spoken language. In some cases, language settings can include explicit language filters.

In some examples, settings 201 can include one or more avatar settings. For example, avatar settings can include, without limitation, attire, size, level of realism, polygon count, or the like. For example, a multi-user experience participant may wish to appear as a ten foot tall cartoon bear. As another example, a multi-user experience participant may select business casual attire as an avatar setting for attending a business meeting.

In some aspects, settings 201 can include privacy settings. For example, privacy settings can include whether to use a pseudonyms or a legal name, whether to display accurate facial expressions or perform facial expression suppression, whether to use a realistic voice or an altered voice, and/or whether to use an authenticated avatar. In some cases, a multi-user experience environment participant may register an authenticated avatar with an avatar registration service that can be used when a multi-user experience requires the use of authenticated avatars as a condition for participation. For example, authenticated avatars may be required at a business negotiation to prevent compromising the integrity of the negotiation by multi-user experience participants misrepresenting their identity.

In some cases, settings 201 can include user interface settings. For example, user interface settings can include, without limitation, whether to display a name placard, whether to reveal titles/roles (e.g., CEO, manager, moderator, administrator, etc.), and/or whether to provide hints to identify a speaker (e.g., an arrow pointing at a speaker, a spotlight, change in color, character effect, or the like). In some cases, a multi-user experience participant may prefer to disable user interface elements to give the multi-user experience a more realistic look and feel. In some examples, a multi-user experience participant may prefer user interface elements to be displays so they can easily identify other multi-user experience participants in the multi-user experience environment, and/or better navigate the multi-user experience environment.

In some implementations, settings 201 can include accessibility settings. For example, accessibility settings can include, without limitation, closed captioning, color blind color scheme, minimum audio level, and/or minimum brightness. In some cases, the multi-user experience coordination system 200 can be configured to enforce the availability of accessibility settings within a multi-user experience.

In some aspects, the settings 201 can include geography specific settings. For example, based on a multi-user experience participant's location, recording a conversation with the multi-user experience participant may be illegal. In some examples, settings 201 may include a geography specific setting requiring consent before recording the multi-user experience participant.

Additional example settings 201 include settings for relative location of specific multi-user experience participants. For example, a parent may select a setting requiring that their child must always remain within a specific distance of the parent within the multi-user experience environment. As another example, an employee may have the option to select specific participants (e.g., a friend, a colleague, a potential business contact) of the multi-user experience to sit nearby to, across from, immediately next to, or the like.

In some cases, the settings 201 can be assigned importance weights automatically and/or manually by a multi-user experience participant. For example, importance weights can include, without limitation, strictly required settings (e.g., no recording without consent), critically important settings, mildly important settings, completely optional settings, any other important weights, and/or any combination thereof. In some cases, one or more of the settings 201 can include ranges and/or groups of related settings. In one illustrative example, a multi-user experience participant may select a setting 201 that allows the sky in a multi-user experience environment to be blue, red, or black, but not any other color. In another illustrative example, a multi-user experience participant may select a setting included in settings 201 that specifies a maximum polygon count for user avatars.

In some cases, one or more of the settings 201 can be conditional (e.g., context specific settings). In some cases, one or more of the settings 201 can be conditioned upon hardware capabilities (e.g., battery life, processing power, any other hardware combination, and/or any combination thereof). In one illustrative example, when a multi-user experience participant uses a state of the art HMD to participate in a multi-user experience, a setting allowing for unlimited polygon count may be used. In some cases, when a multi-user experience participant uses a device with limited capability to participate in a multi-user experience, the setting for polygon count may be adjusted to match capabilities of the device. In one illustrative example, a multi-user experience participant can have different groups of settings 201 for different context. For example, a multi-user experience participant may have first settings for work meetings, second settings for family and/or friends, and third settings for multi-user experience participant exceeding a specific number of participants.

As illustrated in FIG. 2, a partition 205 indicates that settings 201 may be created separately from the setting arbitration provided by multi-user experience coordination system 200. For example, the settings 201 can be generated over time in advance of a multi-user experience. In some cases, the settings 201 for all the multi-user experience participants of a particular multi-user experience can be aggregated into a collection of settings 207 when the multi-user experience coordination system 200 is ready to perform settings partitioning and/or arbitration.

As illustrated, the settings partitioning engine 220 can obtain the collection of settings 207 the baseline experience 212, and/or experience parameters 214 as inputs. In some cases, the settings partitioning engine 220 can partition the collection of settings 207 into non-arbitrated settings 222 and arbitrated settings 224. As used herein, the terms arbitrated settings refers to any setting for a multi-user experience that needs to be consistent for all multi-user experience participants. In some cases, arbitrated settings 224 can include mandatory settings (e.g., because a mandatory setting requires the setting to be consistent). In one illustrative example, an arbitrated setting 224 that is also a mandatory setting may require that the sky must be blue for all participants. However, not all arbitrated settings 224 need to be impose a mandatory setting. In some examples, arbitrated settings 224 can be made consistent by agreement between the multi-user experience participants. In one illustrative example, an arbitrated setting 224 can require that all participants agree on a consistent sky color.

In some cases, the settings partitioning engine 220 can initially partition the settings for the multi-user experience based on the settings 201 for each of the multi-user experience participants, the baseline experience 212, and/or the experience parameters 214. In some aspects, the settings partitioning engine 220 can identify arbitrated settings 224 based on device capabilities of the devices belong to the multi-user experience participants. For example, if one or more of the devices does not support a polygon count above a maximum polygon count (e.g., based on the maximum polygon count of the least capable device participating in the multi-user experience, the mean device, the median device, any other measure of device capability, and/or any combination thereof), then the polygon count may become an arbitrated setting 224. In some cases, one or more arbitrated settings 224 may be identified based on one or more baseline experiences 212 and/or experience parameters 214 from the settings partitioning engine 220. For example, the experience parameters 214 may specify that multi-user experiences generated by a meeting scheduler for scheduling meetings between company employees are required to maintain one or more settings 201 consistent between all multi-user experience participants. In one illustrative example, the experience parameters 214 may specify that all employee avatars must wear business casual attire, use their legal name, adhere to common privacy settings, any other specified setting, and/or any combination thereof. As another example, a baseline experience 212 for an art exhibition may cause the settings partitioning engine 220 to determine that displayed art type is an arbitrated setting 224.

Figure 3:
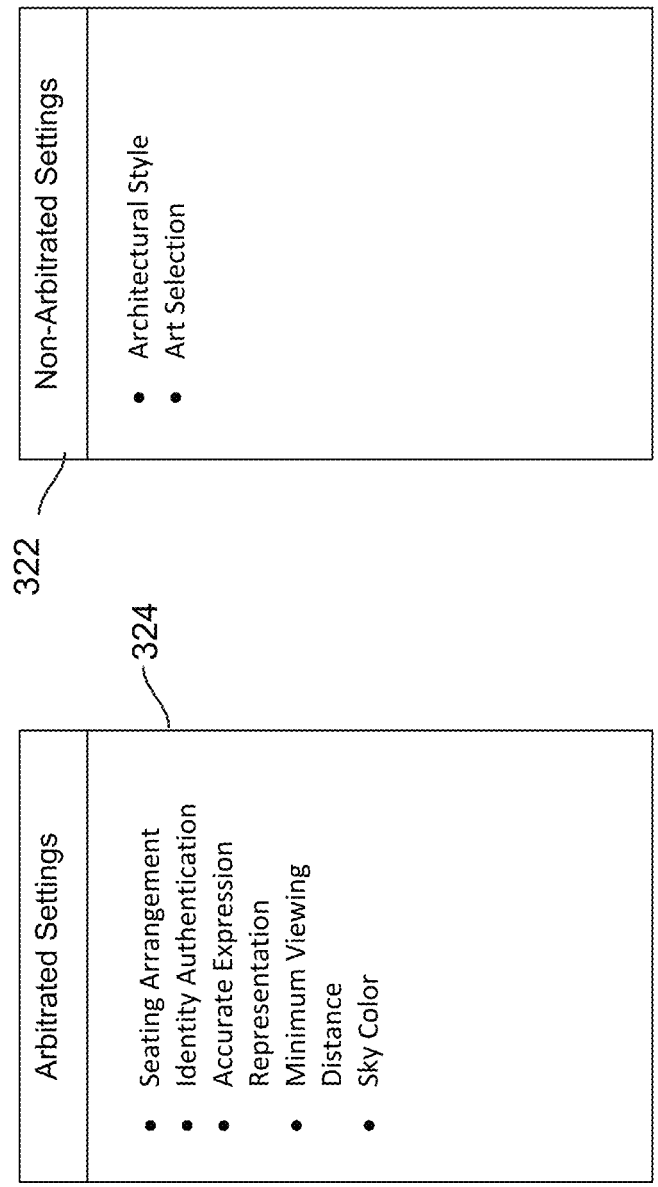
FIG. 3 is a diagram illustrating example arbitrated preferences and non-arbitrated preferences, in accordance with some examples of the present disclosure.

FIG. 3 illustrates an example of initial arbitrated settings 324 and non-arbitrated settings 322 for a particular multi-user experience. The example arbitrated settings 324 and non-arbitrated settings 322 illustrate a small number of settings for the purposes of illustration. It should but understand that fewer, more, and/or different settings can be included in the arbitrated settings 324 and non-arbitrated settings 322 without departing from the scope of the present disclosure.

Returning to FIG. 2, In some implementations, arbitrated settings 224 can be determined by the application engine 210 based on analyzing each user's preferences. For example, settings 201 for a first user may include a setting that all multi-user experiences in which they participate must have the same sky color for all multi-user experience participant. As another example, settings 201 for a second user may indicate that all multi-user experience participants must agree on common privacy settings for a multi-user experience. In some cases, the application engine 210 can generate a superset of arbitrated settings 224 identified from a review of all of the multi-user experience participants' preferences.

As illustrated in FIG. 2, the arbitrated settings 224 from the application engine 210 can be provided to settings arbitration engine 230 for arbitration. In some cases, the settings arbitration engine 230 can arbitrate the arbitrated settings 224 based on different criteria. In some cases, based on arbitrating the arbitrated settings 224, the settings arbitration engine 230 can output one or more potential settings for each arbitrated setting 224 to the experience adaptation engine 240. For example, one or more settings indicated as mandatory in the baseline experience 212, the experience parameters 214, and/or as specified by the meeting owner may be resolved by imposing the mandatory setting on all multi-user experience participants.

In some implementations, the settings arbitration engine 230 can be configured to arbitrate one or more arbitrated settings 224 in advance of a multi-user experience. For example, the settings arbitration engine 230 may determine potential settings for a particular arbitrated setting 224 based on expected multi-user experience participants (e.g., a list of invited participants). In some cases, the settings arbitration engine 230 can be configured to select between potential settings associated with the expected multi-user experience. For example, the settings arbitration engine 230 may apply a first multi-user experience participant's potential setting for a first arbitrated setting may select. In some examples, the settings arbitration engine 230 may apply a second multi-user experience participant's setting for a second arbitrated setting. In some aspects, the settings arbitration engine 230 may apply a default setting for a third arbitrated setting. For example, one or more multi-user experience participants may indicate that the third arbitrated setting should be arbitrated without indicating a preference for the actual setting applied for the third arbitrated setting and the settings arbitration engine 230 may apply a default setting for the third arbitrated setting. In some cases, arbitrating settings for generating a multi-user experience from a given set of settings (e.g., potential settings of expected multi-user experience participants and/or default settings) without deriving new settings (e.g., by combining settings, generating new settings, and/or any combination thereof) may reduce power consumption, memory usage, computational cost and/or any combination thereof.

In some cases, one or more settings can be arbitrated by the settings arbitration engine 230 by dynamically applying the one or more preferences of an active speaker. For example, in a meeting environment, one or more audio settings may be set to match the preferences of an active speaker and can be changed dynamically as different multi-user experience participants speak. In one illustrative example, the multi-user experience may include consecutive presentations by two presenters. In some aspects, the first presenter may have one or more settings 201 that make ambient noise audible to all audience members. For example, the first presenter may believe ambient sound makes the audience feel more like they are attending an in-person experience. In some examples, the second present may have one or more settings 201 that disable ambient noise for all audience members. For example, the presenter may prefer not to be interrupted or distracted, and/or may prefer speaking at a low volume that may not be heard over loud ambient sounds.

In some examples, the settings arbitration engine 230 can arbitrate one or more settings automatically by searching for settings that are amenable to all users. For example, the sky color may be an arbitrated setting 224 because one user insists that the sky color should reflect the time of day in their geographical location. In some cases, the settings arbitration engine 230 may determine that there are no conflicting mandatory settings among the remaining multi-user experience participants, and therefore one multi-user experience participant's setting can be used as a common setting for all multi-user experience participants. In some cases, the settings arbitration engine 230 may determine that two or more potential settings for a particular arbitrated setting 224 may be acceptable to all of the multi-user experience participants and output the two or more potential settings to the experience adaptation engine 240.

In some cases, the settings arbitration engine 230 can determine that two or more settings are acceptable to the multi-user experience participants for a particular arbitrated setting 224. In some cases, in addition to or as an alternative to outputting the two or more potential settings to the experience adaptation engine 240, the settings arbitration engine 230 can generate an adjusted setting by combining the two or more potential settings and can provide the adjusted setting for the arbitrated setting 224 as an output. For example, the settings arbitration engine 230 can generate a mixture percentage of the two or more potential settings for the arbitrated setting 224 to generate the adjusted setting for the arbitrated setting 224. In some cases, the mixture percentages can be equal for each of the two or more potential settings. In some examples, the mixture percentages can be weighted based on one or more weighting criteria. Example weighting criteria can include, without limitation, relative preference strength (e.g., strong preference/slight preference), relative number of multi-user experience participants that prefer one potential setting over another, user engagement indications (e.g., multi-user experience participants that appear to be less engaged may have their preferences prioritized), any other weighting criteria, and/or any combination thereof.

As illustrated in FIG. 2, an experience adaptation engine 240 can receive non-arbitrated settings 222 directly from the settings partitioning engine 220 and the one or more potential settings for each arbitrated setting 224 output by the settings arbitration engine 230. In some cases, the experience adaptation engine 240 can generate an adapted experience 250 based on the non-arbitrated settings 222 and the one or more potential settings for each arbitrated setting 224 from the settings arbitration engine 230.

In some aspects, the experience adaptation engine 240 can create an adapted experience 250 that allows individual multi-user experience participants to use their own settings 201 for any non-arbitrated settings 222. In some cases, for arbitrated settings 224, the experience adaptation engine 240 can enforce the settings from the settings arbitration engine 230 for all of the multi-user experience participants.

In some cases, the experience adaptation engine 240 can directly manipulate the multi-user experience to satisfy the settings from the settings arbitration engine 230. For example, without limitation, the experience adaptation engine 240 can adjust the light lux level, adjust music volume, adjust the number of non-player characters, enable or disable automatic language translation, any other settings adjustment and/or any combination thereof. In some cases, the experience adaptation engine 240 can select content for the multi-user experience from a database based on the potential settings for a particular arbitrated setting 224 from the settings arbitration engine 230. In some cases, where there are two or potential settings for a particular arbitrated setting 224, a mix of content elements satisfying two or more potential settings can be selected. For example, if the two potential settings for furniture style are modern and antique, the experience adaptation engine 240 may select a mix of modern furniture and antique furniture.

In some cases, the experience adaptation engine 240 can partition the adapted experience 250 into different partitions that each utilize one of the two or more potential settings. For example, one side of a conference room in a multi-user experience may include all of the antique furniture and the other side of the conference room may include all of the modern furniture.

In some cases, the experience adaptation engine 240 can perform environment blending to generate a smoother transition between partitions in the multi-user experience environment. For example, a multi-user experience environment may be partitioned to appear to have a blue sky to multi-user experience participants standing in one partition and can appear to have a red sky to multi-user experience participants standing in another partition. In some cases, the experience adaptation engine 240 can gradually transition the sky color between blue and red as a multi-user experience participant moves from one partition to the other.

In some cases, when there are two or more potential settings for a particular arbitrated setting 224, the experience adaptation engine 240 can attempt to generate new content that combines two or more different potential settings into a new setting that combines the two or more potential settings. For example, as noted above, the settings arbitration engine 230 can generate an adjusted setting for an arbitrated setting 224 that specifies a mixture percentage for combining two or more potential settings. In some cases, the experience adaptation engine 240 can include one or more generative neural networks (e.g., NLG 114, image generation 124, audio generation 134, and/or a multi-model neural network) that can generate new content for the multi-user experience environment. For example, a generative neural network may receive the mixture percentage for combining two or more settings as an input and the generative neural network can output new content that incorporates a mixture of the preferences (e.g., a combined modern/antique piece of furniture).

In some implementations, rather than dynamically generation the adapted experience 250, the experience adaptation engine 240 can be configured to generate a plurality of potential multi-user experience environment based on the one or more potential settings for the arbitrated setting 224 in advance of the multi-user experience. In some cases, the multi-user experience can be selected form the plurality of potential multi-user experience environments by a vote of the multi-user experience participants (e.g., a list of invited participants may be given the option to vote on the multi-user experience environment). In some cases, the experience adaptation engine 240 may also be configured to select the environment from the plurality of generated environments based on prior experience with the multi-user experience participants, analysis of the generated multi-user experience environments and expected user engagement for the multi-user experience participants, any other selection criteria, and/or any combination thereof.

In some cases, settings partitioning engine 220 and/or settings arbitration engine 230 may obtain feedback from the adapted experience 250 that can dynamically influence the preference partitioning and/or preference arbitration outcomes. For example, as a result of the departure of a multi-user experience participant from the multi-user experience, a setting may change from being an arbitrated setting 224 to a non-arbitrated setting 222. For example, if the departing participant was the only participant with a setting requiring all multi-user experience participants to share a common sky color, the sky color setting may become a non-arbitrated setting 222

Figure 4A:
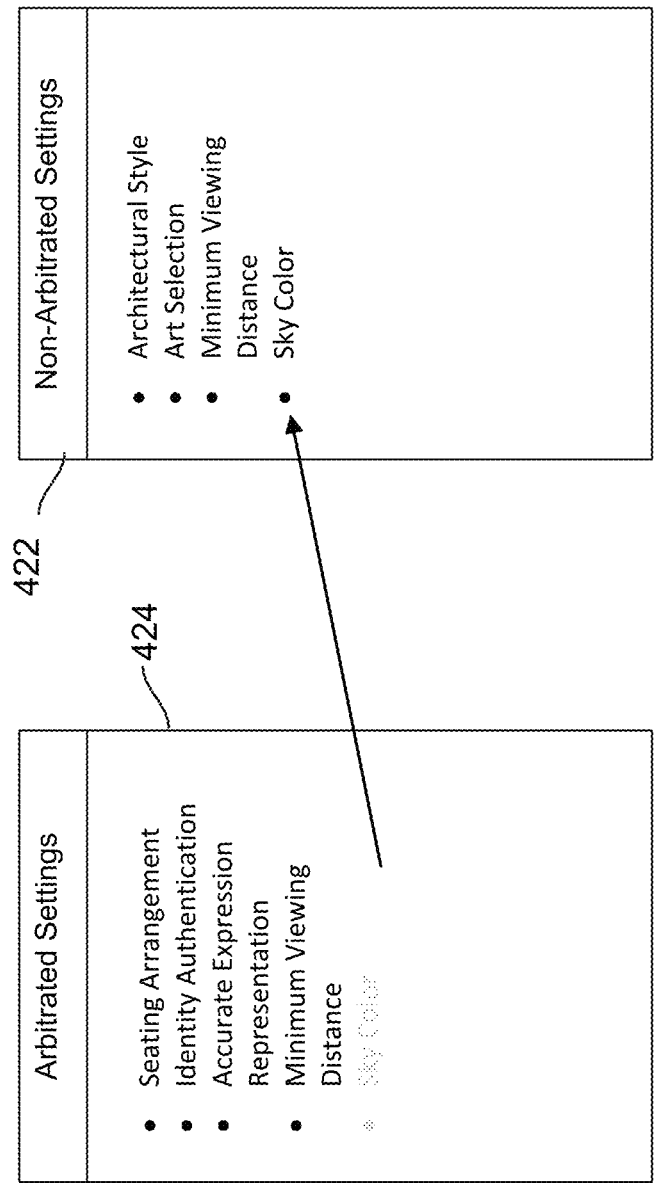
FIG. 4A is a diagram illustrating a setting transitioning from being an arbitrated setting to a non-arbitrated setting, in accordance with some examples of the present disclosure.

FIG. 4A illustrates an example of an arbitrated setting 424 becoming a non-arbitrated setting 422. FIG. 4A illustrates the change of arbitration status for the sky color as indicated by the movement of sky color from the arbitrated settings 424 to the non-arbitrated settings 422.

Returning to FIG. 2, in some cases, a non-arbitrated setting 222 may become an arbitrated setting 224 based on a new multi-user experience participant joining the multi-user experience. For example, a new multi-user experience participant may join the multi-user experience to initiate an art exhibition. In some cases, the art selection may change from a non-arbitrated setting 222 to an arbitrated setting 224.

Figure 4B:
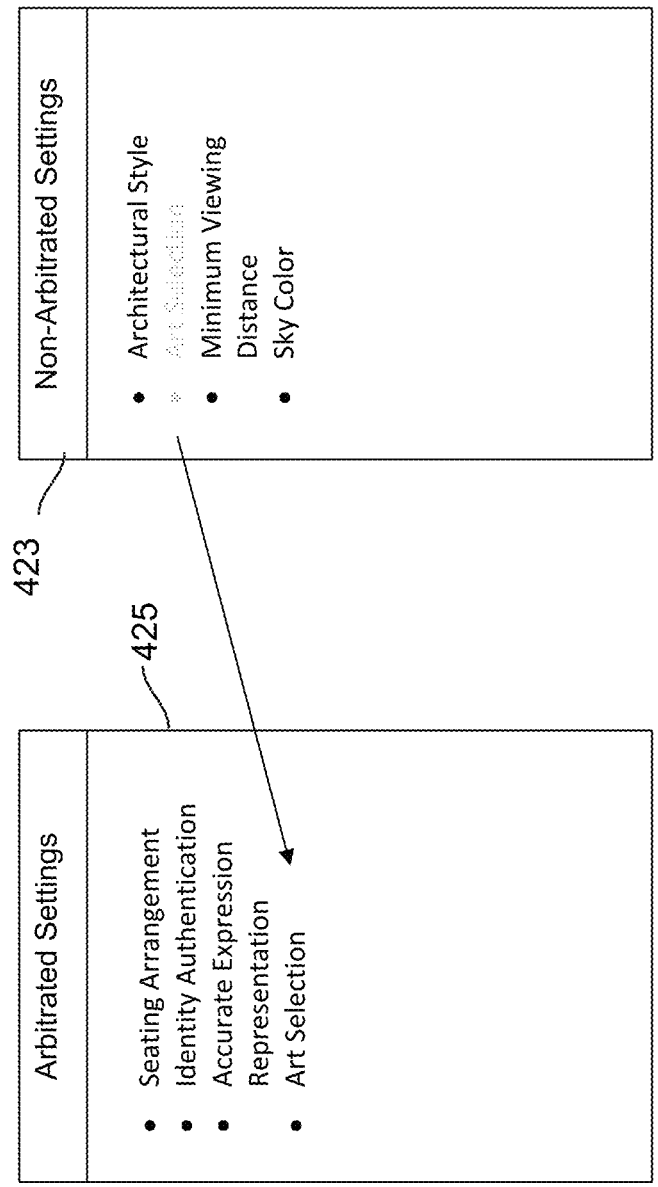
FIG. 4B is a diagram illustrating a setting transitioning from being a non-arbitrated setting to an arbitrated setting, in accordance with some examples of the present disclosure.

FIG. 4B illustrates an example of a non-arbitrated setting 423 becoming an arbitrated setting 425. FIG. 4B illustrates the change of arbitration status for art style as indicated by the movement of art style from the non-arbitrated settings 423 to the arbitrated settings 425.

Returning to FIG. 2, in some cases, based on updates to the potential settings for each arbitrated setting 224 provided to the experience adaptation engine 240 by the settings arbitration engine 230 and/or based on a change in arbitration status from a non-arbitrated setting 222 to an arbitrated setting 224 or vice-versa, the experience adaptation engine 240 can update the adapted experience 250. For example, if a setting remains as an arbitrated setting 224 and the one or more potential settings for the arbitrated setting 224 provided by the settings arbitration engine 230 to the experience adaptation engine 240 change, the experience adaptation engine 240 can update the adapted experience 250 in accordance with the updated potential settings for any arbitrated setting 224. Similarly, if a setting transitions between non-arbitrated setting 222 and arbitrated setting 224 in either direction, the experience adaptation engine 240 can update the adapted experience 250 accordingly.

In some cases, the settings arbitration engine 230 can use hysteresis to suppress changes to potential settings for a particular arbitrated setting 224. For example, as multi-user experience participants enter and exit the multi-user experience, the settings arbitration engine 230 may not instantly change the number of chairs in the multi-user experience environments. In one illustrative example, the settings arbitration engine 230 may update the number of chairs only when the number of chairs differs from the number of multi-user experience participants by more than two. Similarly, in some cases, the experience adaptation engine 240 can use hysteresis to suppress changes in potential settings for an arbitrated setting 224 and/or changes in arbitration status between non-arbitrated setting 222 and arbitrated setting 224 in either direction.

In some implementations, an adaptive settings adjustment engine 260 may obtain data from the adapted experience 250. For example, the adapted experience 250 may provide content interaction information, user engagement data, and/or any other data from the adapted experience 250. As one illustrative example, the adapted experience 250 may provide data to the adaptive settings adjustment engine 260 indicating that a particular setting applied in the multi-user experience environment of the adapted experience 250 increased engagement for a target multi-user experience participant. In some cases, the adaptive settings adjustment engine 260 can determine whether the existing settings for the target multi-user experience participant reflect that the setting resulting in increased engagement is preferred by the target multi-user experience participant. In some cases, the adaptive settings adjustment engine 260 can add one or more new settings for the target multi-user experience participant and/or update one or more existing settings for the target multi-user experience participant based on determining that the target multi-user experience participant's existing settings do not properly address the target multi-user experience participant's preference for the particular setting. In some implementations, a machine learning model (e.g., reinforcement learning model trained on engagement statistics) can determine whether to change the target multi-user experience participant's preferences and/or the specific types of changes to apply to the target multi-user experience participant's settings.

In some cases, the multi-user experience coordination system 200 may not be able to honor one or more preferences of a particular multi-user experience participant. For example, a mandatory setting for the particular multi-user experience participant may conflict with a mandatory setting imposed by the meeting owner. In some cases, the meeting owner's mandatory setting may have priority over the particular multi-user experience participant's setting. In some cases, the multi-user experience coordination system 200 may output a warning to the particular multi-user experience participant that the setting will not be honored and asking whether the particular multi-user experience participant still wishes to join the multi-user experience.

In some cases, the multi-user experience coordination system 200 can provide a user interface for multi-user experience participant to inspect multi-user experience environment contents to determine whether the inspected content was included in the multi-user experience environment based on an arbitrated setting 224. For example, the adapted experience 250 may display metadata and/or tags indicating the provenance of one or more settings. In some cases, the metadata and/or tags can be superimposed on objects in the multi-user experience environment. In some cases, there may be a menu in the user interface that displays all of the settings for the multi-user experience environment, whether or not they are arbitrated, and/or the one or more potential settings for the arbitrated settings 224.

In some cases, the multi-user experience coordination system 200 can allow multi-user experience participants save a set of arbitrated settings 224 and non-arbitrated settings 222 for an environment as settings for future multi-user experiences.

As noted above, the multi-user experience coordination system 200 and related techniques described herein can provide coordinated multi-user experiences. The systems and techniques can partition settings into arbitrated settings and non-arbitrated settings. An arbitration engine can arbitrate the arbitrated settings to determine one or more adjusted settings for each arbitrated setting. An experience adaptation engine can generate an adapted experience that enforces the adjusted settings for each arbitrated setting while allowing participants to use their own settings for non-arbitrated preferences.

Figure 5:
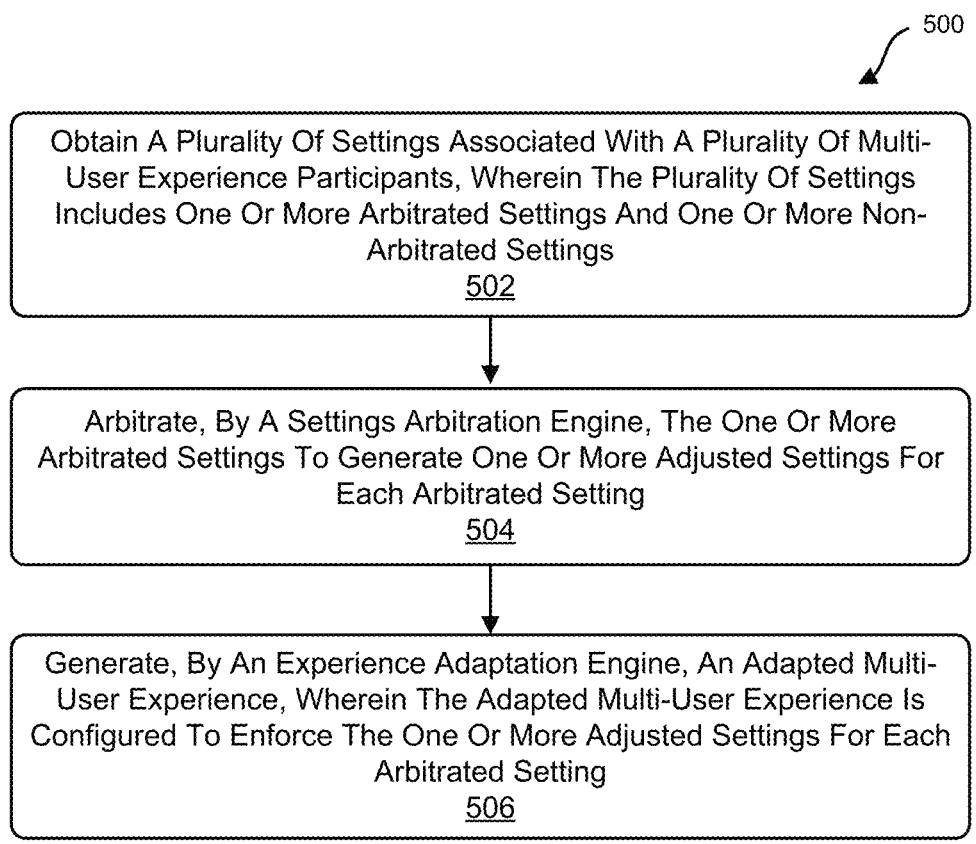
FIG. 5 is a flow diagram illustrating an example of a process for content adaptation, in accordance with some examples of the present disclosure.

FIG. 5 is a flow diagram illustrating an example of a process 500 of coordinating multi-user experiences. The process 500 and/or other process described herein can be performed by a computing device (or apparatus) or a component (e.g., a chipset, codec, etc.) of the computing device. The computing device may be an extended reality (XR) device (e.g., a virtual reality (VR) device or augmented reality (AR) device), a mobile device (e.g., a mobile phone), a network-connected wearable such as a watch, a vehicle or component or system of a vehicle, or other type of computing device. In one example, the process 500 and/or other process described herein can be performed by the multi-user experience coordination system 200 of FIG. 2. In another example, one or more of the processes can be performed by the computing system 800 shown in FIG. 8. For instance, a computing device with the computing system 800 shown in FIG. 8 can include the components of the multi-user experience coordination system 200 and can implement the operations of the process 500 of FIG. 5 and/or other process described herein. The operations of the process 500 may be implemented as software components that are executed and run on one or more processors (e.g., the processor 810 of FIG. 8, a processor such as a DSP, GPU, NPU, etc. configured to execute a machine learning model or algorithm, such as the deep learning network 600 of FIG. 6 or the CNN 700 of FIG. 7, or other processor(s)). Further, the transmission and reception of signals by the computing device in the process 500 may be enabled, for example, by one or more antennas, one or more transceivers (e.g., wireless transceiver(s)), and/or other communication components of the computing device (e.g., the communications interface 840 of FIG. 8).

At block 502, the computing device (or component thereof) can obtain a plurality of settings (e.g., settings 201 of FIG. 2) associated with a plurality of multi-user experience participants. In some examples, the plurality of settings includes one or more arbitrated settings (e.g., arbitrated settings 224 of FIG. 2) and one or more non-arbitrated settings (e.g., non-arbitrated setting 222 of FIG. 2). In some cases, the plurality of settings includes one or more arbitrated settings for a first multi-user experience participant and one or more arbitrated settings for a second multi-user experience participant. In some aspects, the one or more arbitrated settings include an individual arbitrated setting. In some implementations, the one or more arbitrated settings for the first multi-user experience participant includes a first setting for the individual arbitrated setting; and the one or more arbitrated settings for the second multi-user experience participant includes a second setting for the individual arbitrated setting.

At block 504, the computing device (or component thereof) can arbitrate, by a settings arbitration engine (e.g., settings arbitration engine 230 of FIG. 2), the one or more arbitrated settings to generate one or more adjusted settings for each arbitrated setting. In some examples, arbitrating, by the settings arbitration engine, the individual arbitrated setting includes selecting between the first setting for the individual arbitrated setting and the second setting for the individual arbitrated setting. In some cases, arbitrating, by the settings arbitration engine, the individual arbitrated setting includes generating an adjusted setting for the individual arbitrated setting based on the first setting for the individual arbitrated setting and the second setting for the individual arbitrated setting. In some aspects, the adjusted setting for the individual arbitrated setting is different from the first setting for the individual arbitrated setting and the second setting for the individual arbitrated setting. In some cases, arbitrating, by the settings arbitration engine, the individual arbitrated setting includes selecting the second setting for the individual arbitrated setting. In some implementations, the second setting for the individual arbitrated setting includes a preference for the individual arbitrated setting and the first setting for the individual arbitrated setting includes no preference for the individual arbitrated setting. In some examples, generating an adjusted setting for the individual arbitrated setting includes combining the first setting for the individual arbitrated setting and the second setting for the individual arbitrated setting. In some aspects, combining the first setting for the individual arbitrated setting and the second setting for the individual arbitrated setting includes generating a percentage combination of the first setting for the individual arbitrated setting and the second setting for the individual arbitrated setting. In some examples, the plurality of settings associated with the plurality of multi-user experience participants includes a plurality of preference strengths. In some examples, generating the percentage combination includes applying a weighting based on the plurality of preference strengths.

In some examples, the first setting for the individual arbitrated setting includes a first preference range for the individual arbitrated setting, the second setting for the individual arbitrated setting includes a second preference range for the individual arbitrated setting. In some aspects, arbitrating, by the settings arbitration engine, the individual arbitrated setting includes selecting from an overlapping preference range associated with the first preference range for the individual arbitrated setting and the second preference range for the individual arbitrated setting. In some cases, the second preference range for the individual arbitrated setting is a superset of the first preference range for the individual arbitrated setting. In some aspects, arbitrating, by the settings arbitration engine, the individual arbitrated setting includes selecting the first preference range for the individual arbitrated setting.

At block 506, the computing device (or component thereof) can generate, by an experience adaptation engine (e.g., experience adaptation engine 240 of FIG. 2), an adapted multi-user experience (e.g., adapted experience 250 of FIG. 2). In some examples, the adapted multi-user experience is configured to enforce the one or more adjusted settings for each arbitrated setting. enforcing an individual arbitrated setting of the one or more arbitrated settings includes at least one or more of: directly manipulating the adapted multi-user experience to match the individual arbitrated setting; selecting a portion of the adapted multi-user experience from a database based on the individual arbitrated setting; or partitioning the adapted multi-user experience. In some examples, a first partition of the adapted multi-user experience includes a first setting for the individual arbitrated setting associated with a first multi-user experience participant and a second partition of the adapted multi-user experience includes a second setting for the individual arbitrated setting associated with a second multi-user experience participant; or generating a blended portion of the adapted multi-user experience. In some cases, the blended portion of the adapted multi-user experience includes the first setting for the individual arbitrated setting associated with the first multi-user experience participant and the second setting for the individual arbitrated setting associated with the second multi-user experience participant.

In some cases, a first multi-user experience participant and a second multi-user experience participant participate in the adapted multi-user experience; and the adapted multi-user experience for the first multi-user experience participant includes the one or more adjusted settings for each arbitrated setting and a first setting for the first multi-user experience participant associated with a first non-arbitrated setting. In some implementations, the adapted multi-user experience for the second multi-user experience participant comprises the one or more adjusted settings for each arbitrated setting and a second setting for the second multi-user experience participant associated with the first non-arbitrated setting. In some aspects, the second setting for the second multi-user experience participant associated with the first non-arbitrated setting is different from the first setting for the first multi-user experience participant associated with the first non-arbitrated setting. In some examples, the second setting for the second multi-user experience participant associated with the first non-arbitrated setting matches the first setting for the first multi-user experience participant associated with the first non-arbitrated setting. In some cases, the computing device (or component thereof) can partition, by a partitioning engine, the plurality of settings into the one or more arbitrated settings and the one or more non-arbitrated settings. In some aspects, partitioning a setting of the plurality of settings into the one or more arbitrated settings includes determining whether the setting of the plurality of settings needs to be consistent for all multi-user experience participants. In some examples, enforcing an individual arbitrated setting of the one or more arbitrated settings includes generating, by a generative model, a portion of the adapted multi-user experience. In some cases, generating the portion of the adapted multi-user experience includes incorporating a combination of settings from two or more multi-user experience participants for the individual arbitrated setting of the one or more arbitrated settings.

As noted above, the processes described herein (e.g., process 500 and/or other process described herein) may be performed by a computing device or apparatus. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 500 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 6:
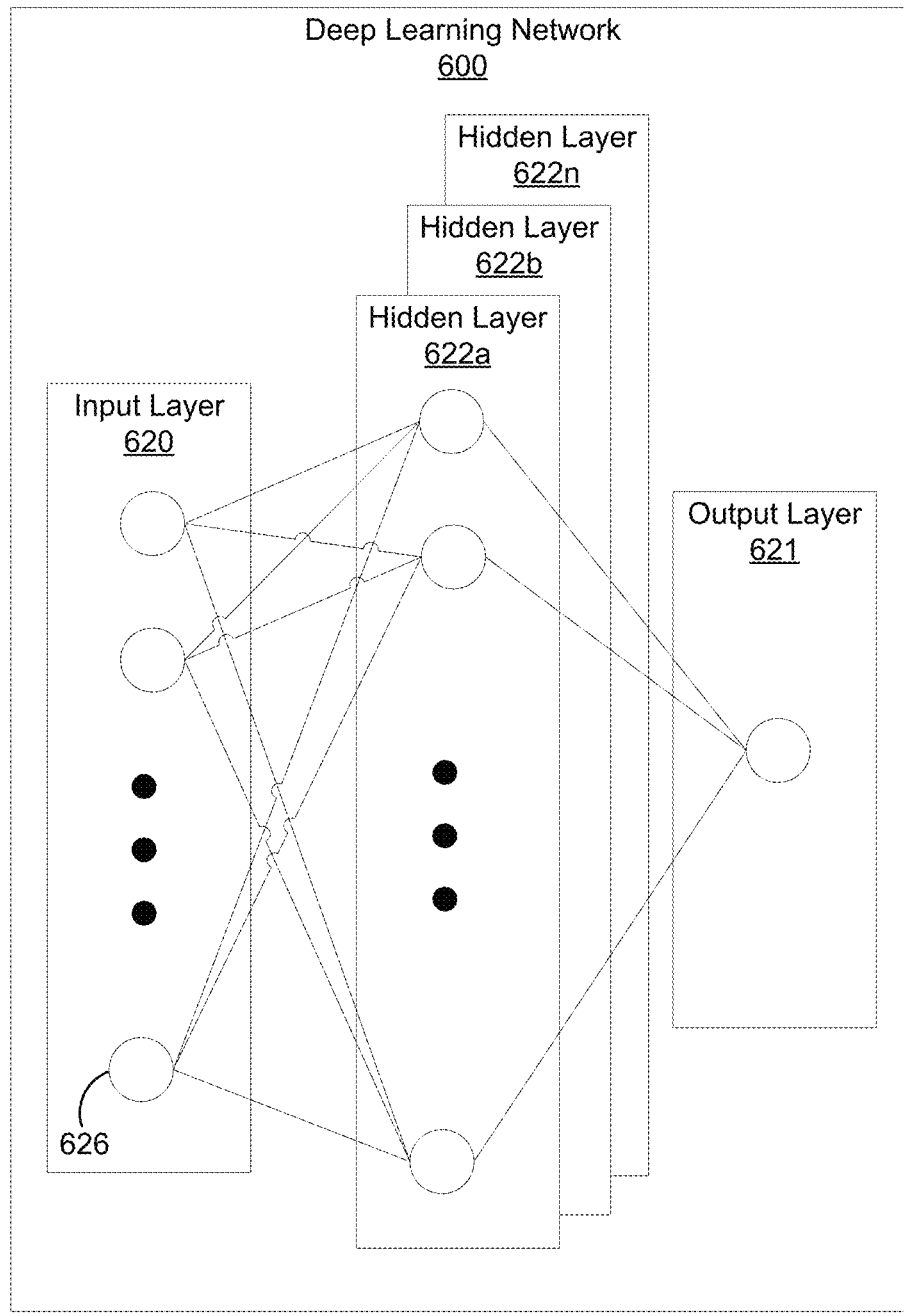
FIG. 6 is a block diagram illustrating an example of a deep learning network, in accordance with some examples of the present disclosure.

As noted above, various aspects of the present disclosure can use machine learning models or systems. FIG. 6 is an illustrative example of a deep learning neural network 600 that can be used to implement the machine learning based feature extraction and/or activity recognition (or classification) described above. An input layer 620 includes input data. In one illustrative example, the input layer 620 can include data representing the pixels of an input video frame. The neural network 600 includes multiple hidden layers 622*a*, 622*b*, through 622*n*. The hidden layers 622*a*, 622*b*, through 622*n* include "n" number of hidden layers, where "n" is an integer greater than or equal to one. The number of hidden layers can be made to include as many layers as needed for the given application. The neural network 600 further includes an output layer 621 that provides an output resulting from the processing performed by the hidden layers 622a, 622b, through 622n. In one illustrative example, the output layer 621 can provide a classification for an object in an input video frame. The classification can include a class identifying the type of activity (e.g., looking up, looking down, closing eyes, yawning, etc.).

The neural network 600 is a multi-layer neural network of interconnected nodes. Each node can represent a piece of information. Information associated with the nodes is shared among the different layers and each layer retains information as information is processed. In some cases, the neural network 600 can include a feed-forward network, in which case there are no feedback connections where outputs of the network are fed back into itself. In some cases, the neural network 600 can include a recurrent neural network, which can have loops that allow information to be carried across nodes while reading in input.

Information can be exchanged between nodes through node-to-node interconnections between the various layers. Nodes of the input layer 620 can activate a set of nodes in the first hidden layer 622a. For example, as shown, each of the input nodes of the input layer 620 is connected to each of the nodes of the first hidden layer 622a. The nodes of the first hidden layer 622a can transform the information of each input node by applying activation functions to the input node information. The information derived from the transformation can then be passed to and can activate the nodes of the next hidden layer 622b, which can perform their own designated functions. Example functions include convolutional, up-sampling, data transformation, and/or any other suitable functions. The output of the hidden layer 622b can then activate nodes of the next hidden layer, and so on. The output of the last hidden layer 622n can activate one or more nodes of the output layer 621, at which an output is provided. In some cases, while nodes (e.g., node 626) in the neural network 600 are shown as having multiple output lines, a node has a single output and all lines shown as being output from a node represent the same output value.

In some cases, each node or interconnection between nodes can have a weight that is a set of parameters derived from the training of the neural network 600. Once the neural network 600 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 600 to be adaptive to inputs and able to learn as more and more data is processed.

The neural network 600 is pre-trained to process the features from the data in the input layer 620 using the different hidden layers 622a, 622b, through 622n in order to provide the output through the output layer 621. In an example in which the neural network 600 is used to identify activities being performed by a driver in frames, the neural network 600 can be trained using training data that includes both frames and labels, as described above. For instance, training frames can be input into the network, with each training frame having a label indicating the features in the frames (for the feature extraction machine learning system) or a label indicating classes of an activity in each frame. In one example using object classification for illustrative purposes, a training frame can include an image of a number 2, in which case the label for the image can be [0 0 1 0 0 0 0 0 0 0].

In some cases, the neural network 600 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 600 is trained well enough so that the weights of the layers are accurately tuned.

For the example of identifying objects in frames, the forward pass can include passing a training frame through the neural network 600. The weights are initially randomized before the neural network 600 is trained. As an illustrative example, a frame can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for the neural network 600, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 600 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $E_{total}=\Sigma \frac{1}{2}(\text{target}-\text{output})^2$. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 600 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w=w_i-\eta dL/dW$, where w denotes a weight, $w_i$ denotes the initial weight, and $\eta$ denotes a learning rate. The learning rate can be set to any suitable value, with a high learning rate including larger weight updates and a lower value indicating smaller weight updates.

The neural network 600 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 600 can include any other deep network other than a CNN, such as an autoencoder, a deep belief nets (DBNs), a Recurrent Neural Networks (RNNs), among others.

Figure 7:
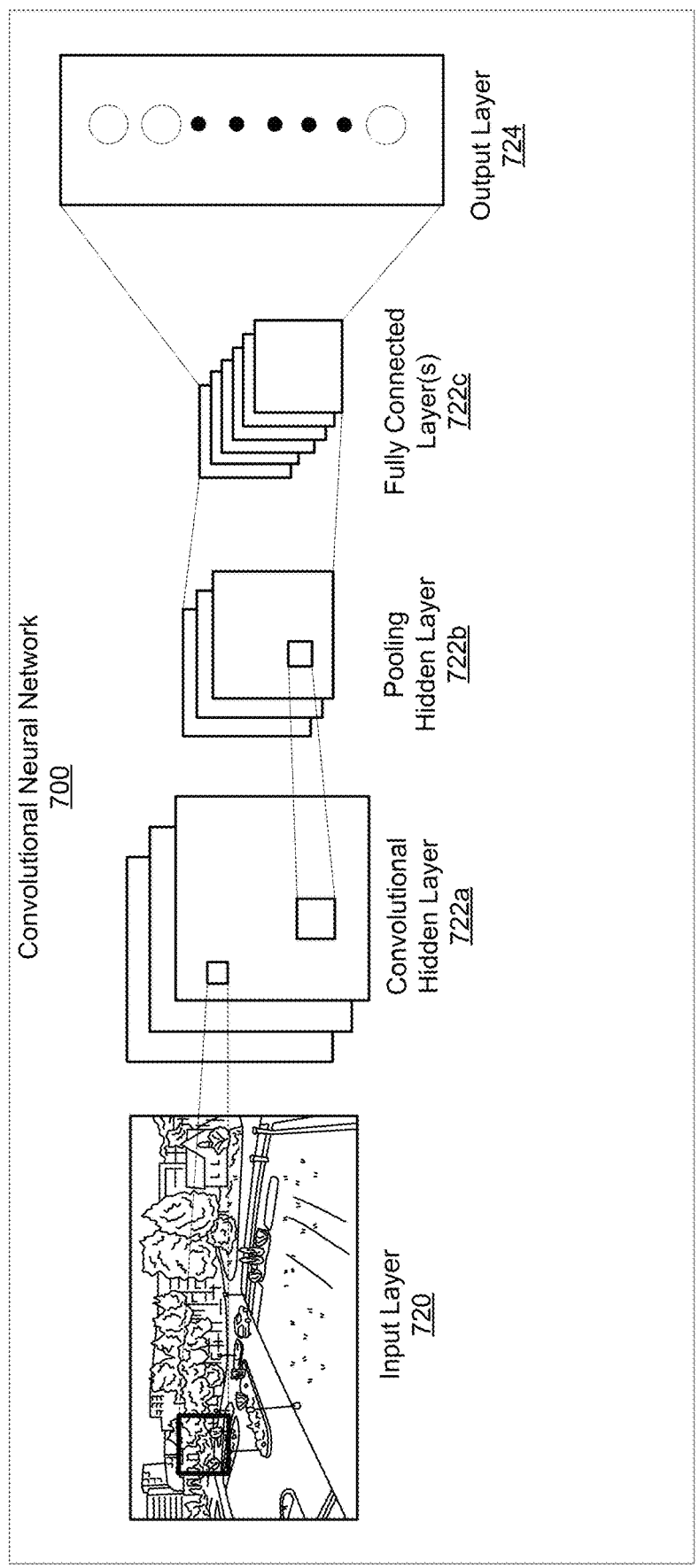
FIG. 7 is a block diagram illustrating an example of a convolutional neural network, in accordance with some examples of the present disclosure.

FIG. 7 is an illustrative example of a convolutional neural network (CNN) 700. The input layer 720 of the CNN 700 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 722a, an optional non-linear activation layer, a pooling hidden layer 722b, and fully connected hidden layers 722c to get an output at the output layer 724. While only one of each hidden layer is shown in FIG. 7, one of ordinary skill will appreciate that multiple convolutional hidden layers, non-linear layers, pooling hidden layers, and/or fully connected layers can be included in the CNN 700. As previously described, the output can indicate a single class of an object or can include a probability of classes that best describe the object in the image.

The first layer of the CNN 700 is the convolutional hidden layer 722a. The convolutional hidden layer 722a analyzes the image data of the input layer 720. Each node of the convolutional hidden layer 722a is connected to a region of nodes (pixels) of the input image called a receptive field. The convolutional hidden layer 722a can be considered as one or more filters (each filter corresponding to a different activation or feature map), with each convolutional iteration of a filter being a node or neuron of the convolutional hidden layer 722a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 722a. Each connection between a node and a receptive field for that node learns a weight and, in some cases, an overall bias such that each node learns to analyze its particular local receptive field in the input image. Each node of the hidden layer 722a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 722a is due to each node of the convolutional layer being applied to its corresponding receptive field. For example, a filter of the convolutional hidden layer 722a can begin in the top-left corner of the input image array and can convolve around the input image. As noted above, each convolutional iteration of the filter can be considered a node or neuron of the convolutional hidden layer 722a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 722a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 722a.

The mapping from the input layer to the convolutional hidden layer 722a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 722a can include several activation maps in order to identify multiple features in an image. The example shown in FIG. 7 includes three activation maps. Using three activation maps, the convolutional hidden layer 722a can detect three different kinds of features, with each feature being detectable across the entire image.

In some examples, a non-linear hidden layer can be applied after the convolutional hidden layer 722a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 700 without affecting the receptive fields of the convolutional hidden layer 722a.

The pooling hidden layer 722b can be applied after the convolutional hidden layer 722a (and after the non-linear hidden layer when used). The pooling hidden layer 722b is used to simplify the information in the output from the convolutional hidden layer 722a. For example, the pooling hidden layer 722b can take each activation map output from the convolutional hidden layer 722a and generates a condensed activation map (or feature map) using a pooling function. Max-pooling is one example of a function performed by a pooling hidden layer. Other forms of pooling functions be used by the pooling hidden layer 722a, such as average pooling, L2-norm pooling, or other suitable pooling functions. A pooling function (e.g., a max-pooling filter, an L2-norm filter, or other suitable pooling filter) is applied to each activation map included in the convolutional hidden layer 722a. In the example shown in FIG. 7, three pooling filters are used for the three activation maps in the convolutional hidden layer 722a.

In some examples, max-pooling can be used by applying a max-pooling filter (e.g., having a size of 2×2) with a stride (e.g., equal to a dimension of the filter, such as a stride of 2) to an activation map output from the convolutional hidden layer 722a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 722a having a dimension of 24×24 nodes, the output from the pooling hidden layer 722b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 700.

The final layer of connections in the network is a fully-connected layer that connects every node from the pooling hidden layer 722b to every one of the output nodes in the output layer 724. Using the example above, the input layer includes 28×28 nodes encoding the pixel intensities of the input image, the convolutional hidden layer 722a includes 3×24×24 hidden feature nodes based on application of a 5×5 local receptive field (for the filters) to three activation maps, and the pooling hidden layer 722b includes a layer of 3×12×12 hidden feature nodes based on application of max-pooling filter to 2×2 regions across each of the three feature maps. Extending this example, the output layer 724 can include ten output nodes. In such an example, every node of the 3×12×12 pooling hidden layer 722b is connected to every node of the output layer 724.

The fully connected layer 722c can obtain the output of the previous pooling hidden layer 722b (which should represent the activation maps of high-level features) and determines the features that most correlate to a particular class. For example, the fully connected layer 722c layer can determine the high-level features that most strongly correlate to a particular class, and can include weights (nodes) for the high-level features. A product can be computed between the weights of the fully connected layer 722c and the pooling hidden layer 722b to obtain probabilities for the different classes. For example, if the CNN 700 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 724 can include an M-dimensional vector (in the prior example, M=10). M indicates the number of classes that the CNN 700 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 8:
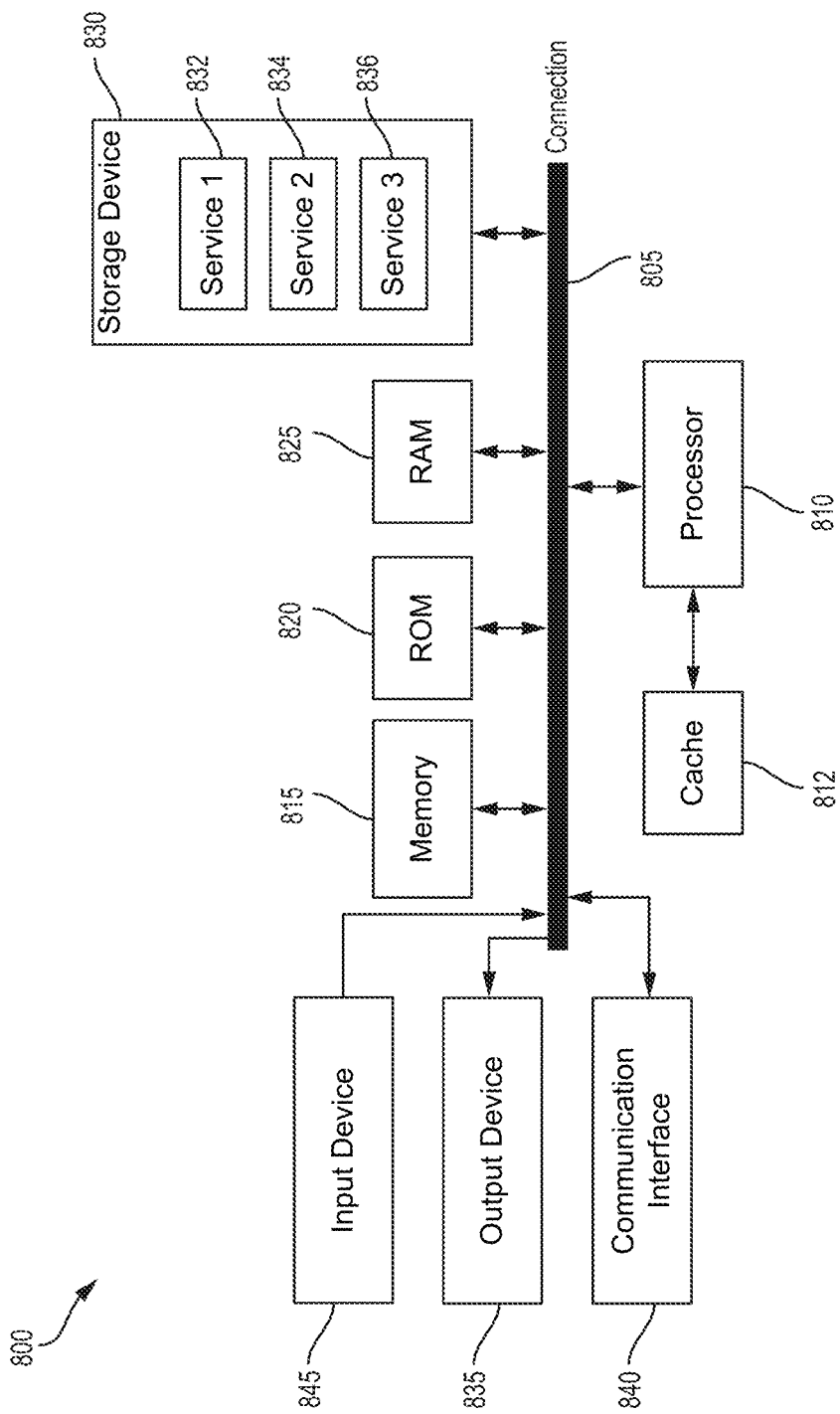
FIG. 8 is a diagram illustrating an example of a computing system for implementing certain aspects described herein.

FIG. 8 is a diagram illustrating an example of a system for implementing certain aspects of the present technology. In particular, FIG. 8 illustrates an example of computing system 800, which can be for example any computing device making up internal computing system, a remote computing system, a camera, or any component thereof in which the components of the system are in communication with each other using connection 805. Connection 805 can be a physical connection using a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache 812 of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X. Y, and Z such that together the multiple processors perform X. Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method of coordinating multi-user experiences, the method comprising: obtaining a plurality of settings associated with a plurality of multi-user experience participants, wherein the plurality of settings includes one or more arbitrated settings and one or more non-arbitrated settings; arbitrating, by a settings arbitration engine, the one or more arbitrated settings to generate one or more adjusted settings for each arbitrated setting; and generating, by an experience adaptation engine, an adapted multi-user experience, wherein the adapted multi-user experience is configured to enforce the one or more adjusted settings for each arbitrated setting.

Aspect 2. The method of Aspect 1, wherein the plurality of settings comprises one or more arbitrated settings for a first multi-user experience participant and one or more arbitrated settings for a second multi-user experience participant.

Aspect 3. The method of any of Aspects 1 to 2, wherein the one or more arbitrated settings comprise an individual arbitrated setting, wherein: the one or more arbitrated settings for the first multi-user experience participant includes a first setting for the individual arbitrated setting; and the one or more arbitrated settings for the second multi-user experience participant includes a second setting for the individual arbitrated setting.

Aspect 4. The method of any of Aspects 1 to 3, wherein arbitrating, by the settings arbitration engine, the individual arbitrated setting comprises selecting between the first setting for the individual arbitrated setting and the second setting for the individual arbitrated setting.

Aspect 5. The method of any of Aspects 1 to 4, wherein arbitrating, by the settings arbitration engine, the individual arbitrated setting comprises generating an adjusted setting for the individual arbitrated setting based on the first setting for the individual arbitrated setting and the second setting for the individual arbitrated setting, wherein the adjusted setting for the individual arbitrated setting is different from the first setting for the individual arbitrated setting and the second setting for the individual arbitrated setting.

Aspect 6. The method of any of Aspects 1 to 5, wherein arbitrating, by the settings arbitration engine, the individual arbitrated setting comprises selecting the second setting for the individual arbitrated setting, wherein the second setting for the individual arbitrated setting includes a preference for the individual arbitrated setting and the first setting for the individual arbitrated setting includes no preference for the individual arbitrated setting.

Aspect 7. The method of any of Aspects 1 to 6, wherein: the first setting for the individual arbitrated setting includes a first preference range for the individual arbitrated setting; the second setting for the individual arbitrated setting includes a second preference range for the individual arbitrated setting; and arbitrating, by the settings arbitration engine, the individual arbitrated setting comprises selecting from an overlapping preference range associated with the first preference range for the individual arbitrated setting and the second preference range for the individual arbitrated setting.

Aspect 8. The method of any of Aspects 1 to 7, wherein the second preference range for the individual arbitrated setting is a superset of the first preference range for the individual arbitrated setting, and wherein arbitrating, by the settings arbitration engine, the individual arbitrated setting comprises selecting the first preference range for the individual arbitrated setting.

Aspect 9. The method of any of Aspects 1 to 8, wherein generating an adjusted setting for the individual arbitrated setting comprises combining the first setting for the individual arbitrated setting and the second setting for the individual arbitrated setting.

Aspect 10. The method of any of Aspects 1 to 9, wherein combining the first setting for the individual arbitrated setting and the second setting for the individual arbitrated setting comprises generating a percentage combination of the first setting for the individual arbitrated setting and the second setting for the individual arbitrated setting.

Aspect 11. The method of any of Aspects 1 to 10, wherein the plurality of settings associated with the plurality of multi-user experience participants comprises a plurality of preference strengths, wherein generating the percentage combination comprises applying a weighting based on the plurality of preference strengths.

Aspect 12. The method of any of Aspects 1 to 11, wherein: a first multi-user experience participant and a second multi-user experience participant participate in the adapted multi-user experience; and the adapted multi-user experience for the first multi-user experience participant includes the one or more adjusted settings for each arbitrated setting and a first setting for the first multi-user experience participant associated with a first non-arbitrated setting.

Aspect 13. The method of any of Aspects 1 to 12, wherein the adapted multi-user experience for the second multi-user experience participant comprises the one or more adjusted settings for each arbitrated setting and a second setting for the second multi-user experience participant associated with the first non-arbitrated setting.

Aspect 14. The method of any of Aspects 1 to 13, wherein the second setting for the second multi-user experience participant associated with the first non-arbitrated setting is different from the first setting for the first multi-user experience participant associated with the first non-arbitrated setting.

Aspect 15. The method of any of Aspects 1 to 14, wherein the second setting for the second multi-user experience participant associated with the first non-arbitrated setting matches the first setting for the first multi-user experience participant associated with the first non-arbitrated setting.

Aspect 16. The method of any of Aspects 1 to 15, further comprising partitioning, by a partitioning engine, the plurality of settings into the one or more arbitrated settings and the one or more non-arbitrated settings, wherein partitioning a setting of the plurality of settings into the one or more arbitrated settings comprises determining whether the setting of the plurality of settings needs to be consistent for all multi-user experience participants.

Aspect 17. The method of any of Aspects 1 to 16, wherein enforcing an individual arbitrated setting of the one or more arbitrated settings comprises generating, by a generative model, a portion of the adapted multi-user experience, wherein generating the portion of the adapted multi-user experience comprises incorporating a combination of settings from two or more multi-user experience participants for the individual arbitrated setting of the one or more arbitrated settings.

Aspect 18. The method of any of Aspects 1 to 17, wherein enforcing an individual arbitrated setting of the one or more arbitrated settings comprises at least one or more of: directly manipulating the adapted multi-user experience to match the individual arbitrated setting; selecting a portion of the adapted multi-user experience from a database based on the individual arbitrated setting; partitioning the adapted multi-user experience, wherein a first partition of the adapted multi-user experience includes a first setting for the individual arbitrated setting associated with a first multi-user experience participant and a second partition of the adapted multi-user experience includes a second setting for the individual arbitrated setting associated with a second multi-user experience participant; or generating a blended portion of the adapted multi-user experience, wherein the blended portion of the adapted multi-user experience includes the first setting for the individual arbitrated setting associated with the first multi-user experience participant and the second setting for the individual arbitrated setting associated with the second multi-user experience participant.

Aspect 19. An apparatus for coordinating multi-user experiences. The apparatus includes at least one memory and at least one processor coupled to the at least one memory. The at least one processor is configured to: obtain a plurality of settings associated with a plurality of multi-user experience participants, wherein the plurality of settings includes one or more arbitrated settings and one or more non-arbitrated settings; arbitrate, by a settings arbitration engine, the one or more arbitrated settings to generate one or more adjusted settings for each arbitrated setting; and generate, by an experience adaptation engine, an adapted multi-user experience, wherein the adapted multi-user experience is configured to enforce the one or more adjusted settings for each arbitrated setting.

Aspect 20. The apparatus of Aspect 19, wherein the plurality of settings comprises one or more arbitrated settings for a first multi-user experience participant and one or more arbitrated settings for a second multi-user experience participant.

Aspect 21. The apparatus of any of Aspects 19 to 20, wherein the one or more arbitrated settings comprise an individual arbitrated setting, wherein the one or more arbitrated settings for the first multi-user experience participant includes a first setting for the individual arbitrated setting; and the one or more arbitrated settings for the second multi-user experience participant includes a second setting for the individual arbitrated setting.

Aspect 22. The apparatus of any of Aspects 19 to 21, wherein, to arbitrate, by the settings arbitration engine, the individual arbitrated setting, the at least one processor is configured to select between the first setting for the individual arbitrated setting and the second setting for the individual arbitrated setting.

Aspect 23. The apparatus of any of Aspects 19 to 22, wherein, to arbitrate, by the settings arbitration engine, the individual arbitrated setting, the at least one processor is configured to generate an adjusted setting for the individual arbitrated setting based on the first setting for the individual arbitrated setting and the second setting for the individual arbitrated setting, wherein the adjusted setting for the individual arbitrated setting is different from the first setting for the individual arbitrated setting and the second setting for the individual arbitrated setting.

Aspect 24. The apparatus of any of Aspects 19 to 23, wherein, to arbitrate, by the settings arbitration engine, the individual arbitrated setting, the at least one processor is configured to select the second setting for the individual arbitrated setting, wherein the second setting for the individual arbitrated setting includes a preference for the individual arbitrated setting and the first setting for the individual arbitrated setting includes no preference for the individual arbitrated setting.

Aspect 25. The apparatus of any of Aspects 19 to 24, wherein the first setting for the individual arbitrated setting includes a first preference range for the individual arbitrated setting and the second setting for the individual arbitrated setting includes a second preference range for the individual arbitrated setting, and wherein, to arbitrate, by the settings arbitration engine, the individual arbitrated setting, the at least one processor is configured to selecting from an overlapping preference range associated with the first preference range for the individual arbitrated setting and the second preference range for the individual arbitrated setting.

Aspect 26. The apparatus of any of Aspects 19 to 25, wherein the second preference range for the individual arbitrated setting is a superset of the first preference range for the individual arbitrated setting, and wherein arbitrating, by the settings arbitration engine, the individual arbitrated setting comprises selecting the first preference range for the individual arbitrated setting.

Aspect 27. The apparatus of any of Aspects 19 to 26, wherein generating an adjusted setting for the individual arbitrated setting comprises combining the first setting for the individual arbitrated setting and the second setting for the individual arbitrated setting.

Aspect 28. The apparatus of any of Aspects 19 to 27, wherein combining the first setting for the individual arbitrated setting and the second setting for the individual arbitrated setting comprises generating a percentage combination of the first setting for the individual arbitrated setting and the second setting for the individual arbitrated setting.

Aspect 29. The apparatus of any of Aspects 19 to 28, wherein the plurality of settings associated with the plurality of multi-user experience participants comprises a plurality of preference strengths, wherein generating the percentage combination comprises applying a weighting based on the plurality of preference strengths.

Aspect 30. The apparatus of any of Aspects 19 to 29, wherein: a first multi-user experience participant and a second multi-user experience participant participate in the adapted multi-user experience; and the adapted multi-user experience for the first multi-user experience participant includes the one or more adjusted settings for each arbitrated setting and a first setting for the first multi-user experience participant associated with a first non-arbitrated setting.

Aspect 31. The apparatus of any of Aspects 19 to 30, wherein the adapted multi-user experience for the second multi-user experience participant comprises the one or more adjusted settings for each arbitrated setting and a second setting for the second multi-user experience participant associated with the first non-arbitrated setting.

Aspect 32. The apparatus of any of Aspects 19 to 31, wherein the second setting for the second multi-user experience participant associated with the first non-arbitrated setting is different from the first setting for the first multi-user experience participant associated with the first non-arbitrated setting.

Aspect 33. The apparatus of any of Aspects 19 to 32, wherein the second setting for the second multi-user experience participant associated with the first non-arbitrated setting matches the first setting for the first multi-user experience participant associated with the first non-arbitrated setting.

Aspect 34. The apparatus of any of Aspects 19 to 33, wherein the at least one processor is configured to partition the plurality of settings into the one or more arbitrated settings and the one or more non-arbitrated settings, wherein partitioning a setting of the plurality of settings into the one or more arbitrated settings comprises determining whether the setting of the plurality of settings needs to be consistent for all multi-user experience participants.

Aspect 35. The apparatus of any of Aspects 19 to 34, wherein enforcing an individual arbitrated setting of the one or more arbitrated settings comprises generating, by a generative model, a portion of the adapted multi-user experience, wherein generating the portion of the adapted multi-user experience comprises incorporating a combination of settings from two or more multi-user experience participants for the individual arbitrated setting of the one or more arbitrated settings.

Aspect 36. The apparatus of any of Aspects 19 to 35, wherein enforcing an individual arbitrated setting of the one or more arbitrated settings comprises at least one or more of: directly manipulating the adapted multi-user experience to match the individual arbitrated setting; selecting a portion of the adapted multi-user experience from a database based on the individual arbitrated setting; partitioning the adapted multi-user experience, wherein a first partition of the adapted multi-user experience includes a first setting for the individual arbitrated setting associated with a first multi-user experience participant and a second partition of the adapted multi-user experience includes a second setting for the individual arbitrated setting associated with a second multi-user experience participant; or generating a blended portion of the adapted multi-user experience, wherein the blended portion of the adapted multi-user experience includes the first setting for the individual arbitrated setting associated with the first multi-user experience participant and the second setting for the individual arbitrated setting associated with the second multi-user experience participant.

Aspect 37: A non-transitory computer-readable storage medium having stored thereon instructions which, when executed by one or more processors, cause the one or more processors to perform any of the operations of aspects 1 to 36.

Aspect 38: An apparatus comprising means for performing any of the operations of aspects 1 to 36.

What is claimed is:

1. A method of coordinating multi-user experiences, the method comprising:
   obtaining a plurality of settings associated with a plurality of multi-user experience participants of a multi-user experience, wherein the plurality of settings includes one or more arbitrated settings and one or more non-arbitrated settings, and wherein the multi-user experience comprises a virtual environment;
   arbitrating, by a settings arbitration engine, the one or more arbitrated settings to generate one or more adjusted settings for each arbitrated setting; generating, by an experience adaptation engine, an adapted multi-user experience, wherein the adapted multi-user experience is configured to enforce the one or more adjusted settings for each arbitrated setting; and
   transmitting a portion of the adapted multi-user experience to one or more devices associated with the plurality of multi-user experience participants.

2. The method of claim 1, wherein the plurality of settings comprises one or more arbitrated settings for a first multi-user experience participant and one or more arbitrated settings for a second multi-user experience participant.

3. The method of claim 2, wherein the one or more arbitrated settings comprise an individual arbitrated setting, wherein:
   the one or more arbitrated settings for the first multi-user experience participant includes a first setting for the individual arbitrated setting; and
   the one or more arbitrated settings for the second multi-user experience participant includes a second setting for the individual arbitrated setting.

4. The method of claim 3, wherein arbitrating, by the settings arbitration engine, the individual arbitrated setting comprises selecting between the first setting for the individual arbitrated setting and the second setting for the individual arbitrated setting.

5. The method of claim 3, wherein arbitrating, by the settings arbitration engine, the individual arbitrated setting comprises generating an adjusted setting for the individual arbitrated setting based on the first setting for the individual arbitrated setting and the second setting for the individual arbitrated setting, wherein the adjusted setting for the individual arbitrated setting is different from the first setting for the individual arbitrated setting and the second setting for the individual arbitrated setting.

6. The method of claim 3, wherein arbitrating, by the settings arbitration engine, the individual arbitrated setting comprises selecting the second setting for the individual arbitrated setting, wherein the second setting for the individual arbitrated setting includes a preference for the individual arbitrated setting and the first setting for the individual arbitrated setting includes no preference for the individual arbitrated setting.

7. The method of claim 3, wherein:
   the first setting for the individual arbitrated setting includes a first preference range for the individual arbitrated setting;
   the second setting for the individual arbitrated setting includes a second preference range for the individual arbitrated setting; and
   arbitrating, by the settings arbitration engine, the individual arbitrated setting comprises selecting from an overlapping preference range associated with the first preference range for the individual arbitrated setting and the second preference range for the individual arbitrated setting.

8. The method of claim 7, wherein the second preference range for the individual arbitrated setting is a superset of the first preference range for the individual arbitrated setting, and wherein arbitrating, by the settings arbitration engine, the individual arbitrated setting comprises selecting the first preference range for the individual arbitrated setting.

9. The method of claim 3, wherein generating an adjusted setting for the individual arbitrated setting comprises combining the first setting for the individual arbitrated setting and the second setting for the individual arbitrated setting.

10. The method of claim 9, wherein combining the first setting for the individual arbitrated setting and the second setting for the individual arbitrated setting comprises generating a percentage combination of the first setting for the individual arbitrated setting and the second setting for the individual arbitrated setting.

11. The method of claim 10, wherein the plurality of settings associated with the plurality of multi-user experience participants comprises a plurality of preference strengths, wherein generating the percentage combination comprises applying a weighting based on the plurality of preference strengths.

12. The method of claim 1, wherein:
a first multi-user experience participant and a second multi-user experience participant participate in the adapted multi-user experience; and
the adapted multi-user experience for the first multi-user experience participant includes the one or more adjusted settings for each arbitrated setting and a first setting for the first multi-user experience participant associated with a first non-arbitrated setting.

13. The method of claim 12, wherein the adapted multi-user experience for the second multi-user experience participant comprises the one or more adjusted settings for each arbitrated setting and a second setting for the second multi-user experience participant associated with the first non-arbitrated setting.

14. The method of claim 13, wherein the second setting for the second multi-user experience participant associated with the first non-arbitrated setting is different from the first setting for the first multi-user experience participant associated with the first non-arbitrated setting.

15. The method of claim 13, wherein the second setting for the second multi-user experience participant associated with the first non-arbitrated setting matches the first setting for the first multi-user experience participant associated with the first non-arbitrated setting.

16. The method of claim 1, further comprising partitioning, by a partitioning engine, the plurality of settings into the one or more arbitrated settings and the one or more non-arbitrated settings, wherein partitioning a setting of the plurality of settings into the one or more arbitrated settings comprises determining whether the setting of the plurality of settings needs to be consistent for all multi-user experience participants.

17. The method of claim 1, wherein enforcing an individual arbitrated setting of the one or more arbitrated settings comprises generating, by a generative model, a portion of the adapted multi-user experience, wherein generating the portion of the adapted multi-user experience comprises incorporating a combination of settings from two or more multi-user experience participants for the individual arbitrated setting of the one or more arbitrated settings.

18. The method of claim 1, wherein enforcing an individual arbitrated setting of the one or more arbitrated settings comprises at least one or more of:
directly manipulating the adapted multi-user experience to match the individual arbitrated setting;
selecting a portion of the adapted multi-user experience from a database based on the individual arbitrated setting; or
partitioning the adapted multi-user experience, wherein a first partition of the adapted multi-user experience includes a first setting for the individual arbitrated setting associated with a first multi-user experience participant and a second partition of the adapted multi-user experience includes a second setting for the individual arbitrated setting associated with a second multi-user experience participant; or generating a blended portion of the adapted multi-user experience, wherein the blended portion of the adapted multi-user experience includes the first setting for the individual arbitrated setting associated with the first multi-user experience participant and the second setting for the individual arbitrated setting associated with the second multi-user experience participant.

19. The method of claim 1, further comprising:
rendering, on a display, an additional portion of the adapted multi-user experience, the additional portion of the adapted multi-user experience being different from the portion of the adapted multi-user experience.

20. The method of claim 1, further comprising transmitting an additional portion of the adapted multi-user experience to one or more devices associated with the plurality of multi-user experience participants, the additional portion of the adapted multi-user experience being different from the portion of the adapted multi-user experience.

21. An apparatus for coordinating multi-user experiences, comprising:
at least one memory; and
at least one processor coupled to the at least one memory and configured to:
obtain a plurality of settings associated with a plurality of multi-user experience participants of a multi-user experience, wherein the plurality of settings includes one or more arbitrated settings and one or more non-arbitrated settings, and wherein the multi-user experience comprises a virtual environment;
arbitrate, by a settings arbitration engine, the one or more arbitrated settings to generate one or more adjusted settings for each arbitrated setting;
generate, by an experience adaptation engine, an adapted multi-user experience, wherein the adapted multi-user experience is configured to enforce the one or more adjusted settings for each arbitrated setting; and
transmit a portion of the adapted multi-user experience to one or more devices associated with the plurality of multi-user experience participants.

22. The apparatus of claim 21, wherein the plurality of settings comprises one or more arbitrated settings for a first multi-user experience participant and one or more arbitrated settings for a second multi-user experience participant.

23. The apparatus of claim 22, wherein the one or more arbitrated settings comprise an individual arbitrated setting, wherein:
the one or more arbitrated settings for the first multi-user experience participant includes a first setting for the individual arbitrated setting; and
the one or more arbitrated settings for the second multi-user experience participant includes a second setting for the individual arbitrated setting.

24. The apparatus of claim 23, wherein, to arbitrate, by the settings arbitration engine, the individual arbitrated setting, the at least one processor is configured to select between the first setting for the individual arbitrated setting and the second setting for the individual arbitrated setting.

25. The apparatus of claim 23, wherein, to arbitrate, by the settings arbitration engine, the individual arbitrated setting, the at least one processor is configured to generate an adjusted setting for the individual arbitrated setting based on the first setting for the individual arbitrated setting and the second setting for the individual arbitrated setting, wherein the adjusted setting for the individual arbitrated setting is different from the first setting for the individual arbitrated setting and the second setting for the individual arbitrated setting.

26. The apparatus of claim 23, wherein, to arbitrate, by the settings arbitration engine, the individual arbitrated setting, the at least one processor is configured to select the second setting for the individual arbitrated setting, wherein the second setting for the individual arbitrated setting includes a preference for the individual arbitrated setting and the first setting for the individual arbitrated setting includes no preference for the individual arbitrated setting.

27. The apparatus of claim 23, wherein the first setting for the individual arbitrated setting includes a first preference range for the individual arbitrated setting and the second setting for the individual arbitrated setting includes a second preference range for the individual arbitrated setting, and wherein, to arbitrate, by the settings arbitration engine, the individual arbitrated setting, the at least one processor is configured to selecting from an overlapping preference range associated with the first preference range for the individual arbitrated setting and the second preference range for the individual arbitrated setting.

28. The apparatus of claim 27, wherein the second preference range for the individual arbitrated setting is a superset of the first preference range for the individual arbitrated setting, and wherein arbitrating, by the settings arbitration engine, the individual arbitrated setting comprises selecting the first preference range for the individual arbitrated setting.

29. The apparatus of claim 23, wherein generating an adjusted setting for the individual arbitrated setting comprises combining the first setting for the individual arbitrated setting and the second setting for the individual arbitrated setting.

30. The apparatus of claim 29, wherein combining the first setting for the individual arbitrated setting and the second setting for the individual arbitrated setting comprises generating a percentage combination of the first setting for the individual arbitrated setting and the second setting for the individual arbitrated setting.

31. The apparatus of claim 30, wherein the plurality of settings associated with the plurality of multi-user experience participants comprises a plurality of preference strengths, wherein generating the percentage combination comprises applying a weighting based on the plurality of preference strengths.

32. The apparatus of claim 21, wherein:
a first multi-user experience participant and a second multi-user experience participant participate in the adapted multi-user experience; and
the adapted multi-user experience for the first multi-user experience participant includes the one or more adjusted settings for each arbitrated setting and a first setting for the first multi-user experience participant associated with a first non-arbitrated setting.

33. The apparatus of claim 32, wherein the adapted multi-user experience for the second multi-user experience participant comprises the one or more adjusted settings for each arbitrated setting and a second setting for the second multi-user experience participant associated with the first non-arbitrated setting.

34. The apparatus of claim 33, wherein the second setting for the second multi-user experience participant associated with the first non-arbitrated setting is different from the first setting for the first multi-user experience participant associated with the first non-arbitrated setting.

35. The apparatus of claim 33, wherein the second setting for the second multi-user experience participant associated with the first non-arbitrated setting matches the first setting for the first multi-user experience participant associated with the first non-arbitrated setting.

36. The apparatus of claim 21, wherein the at least one processor is configured to partition the plurality of settings into the one or more arbitrated settings and the one or more non-arbitrated settings, wherein partitioning a setting of the plurality of settings into the one or more arbitrated settings comprises determining whether the setting of the plurality of settings needs to be consistent for all multi-user experience participants.

37. The apparatus of claim 21, wherein enforcing an individual arbitrated setting of the one or more arbitrated settings comprises generating, by a generative model, a portion of the adapted multi-user experience, wherein generating the portion of the adapted multi-user experience comprises incorporating a combination of settings from two or more multi-user experience participants for the individual arbitrated setting of the one or more arbitrated settings.

38. The apparatus of claim 21, wherein enforcing an individual arbitrated setting of the one or more arbitrated settings comprises at least one or more of:
directly manipulating the adapted multi-user experience to match the individual arbitrated setting;
selecting a portion of the adapted multi-user experience from a database based on the individual arbitrated setting;
partitioning the adapted multi-user experience, wherein a first partition of the adapted multi-user experience includes a first setting for the individual arbitrated setting associated with a first multi-user experience participant and a second partition of the adapted multi-user experience includes a second setting for the individual arbitrated setting associated with a second multi-user experience participant; or
generating a blended portion of the adapted multi-user experience, wherein the blended portion of the adapted multi-user experience includes the first setting for the individual arbitrated setting associated with the first multi-user experience participant and the second setting for the individual arbitrated setting associated with the second multi-user experience participant.

39. The apparatus of claim 21, wherein the at least one processor is further configured to render, on a display, a second portion of the adapted multi-user experience, the second portion of the adapted multi-user experience being different from the portion of the adapted multi-user experience.

40. The apparatus of claim 21, wherein the at least one processor is further configured to transmit an additional portion of the adapted multi-user experience to one or more devices associated with the plurality of multi-user experience participants, the additional portion of the adapted multi-user experience being different from the portion of the adapted multi-user experience.

\* \* \* \* \*